US009482756B2

(12) United States Patent
Grässer et al.

(10) Patent No.: US 9,482,756 B2
(45) Date of Patent: Nov. 1, 2016

(54) TRACKER UNIT AND METHOD IN A TRACKER UNIT

(71) Applicant: TRIMBLE AB, Danderyd (SE)

(72) Inventors: Christian Grässer, Vallentuna (SE); Suat Köker, Danderyd (SE)

(73) Assignee: TRIMBLE AB, Danderyd (SE)

( * ) Notice: Subject to any disclaimer, the term of this patent is extended or adjusted under 35 U.S.C. 154(b) by 1 day.

(21) Appl. No.: 14/699,895

(22) Filed: Apr. 29, 2015

(65) Prior Publication Data

US 2015/0268347 A1  Sep. 24, 2015

Related U.S. Application Data

(63) Continuation of application No. PCT/EP2012/071655, filed on Nov. 1, 2012.

(51) Int. Cl.
| | |
|---|---|
| *G01S 7/481* | (2006.01) |
| *G01S 17/66* | (2006.01) |
| *G01C 15/00* | (2006.01) |
| *G01S 7/497* | (2006.01) |

(52) U.S. Cl.
CPC ............. *G01S 17/66* (2013.01); *G01C 15/002* (2013.01); *G01S 7/481* (2013.01); *G01S 7/4813* (2013.01); *G01S 7/4972* (2013.01)

(58) Field of Classification Search
CPC ...... G01S 17/66; G01S 7/481; G01S 7/4813; G01S 7/4972; G01C 15/002
See application file for complete search history.

(56) References Cited

U.S. PATENT DOCUMENTS

| 9,075,028 B2 * | 7/2015 | Pruett | ................ G01N 33/0004 |
| 2016/0011098 A1* | 1/2016 | Graham | ................ C03B 23/047 356/246 |

FOREIGN PATENT DOCUMENTS

| WO | 04/001333 A1 | 12/2003 |
| WO | 2008/089789 A1 | 7/2008 |
| WO | 2009/109202 A1 | 9/2009 |
| WO | 2011/098131 A1 | 8/2011 |

OTHER PUBLICATIONS

International Search Report and Written Opinion of the International Searching Authority for International Application No. PCT/EP2012/071655, mailed Mar. 13, 2013, 14 pages.

* cited by examiner

*Primary Examiner* — Tony Ko
(74) *Attorney, Agent, or Firm* — Kilpatrick Townsend & Stockton LLP

(57) ABSTRACT

A tracker unit for a measuring instrument such as a total station is disclosed. The tracker unit comprises a first and at least a second optical radiation source arranged at different positions and each of which is noncoaxially arranged with respect to a tracker pointing axis and adapted to emit optical radiation towards the reflective target when activated. The first and the at least a second optical radiation source are arranged at such positions so that the tracker pointing axis and the position of the first optical radiation source define a first plane and the tracker pointing axis and the position of the at least a second optical radiation source define a second plane, such that the first optical radiation source is coaxial with respect to the tracker pointing axis in a plane perpendicular to the first plane and the at least a second optical radiation source is coaxial with respect to the tracker pointing axis in a plane perpendicular to the second plane. At least one first set of signals is generated on basis of optical radiation impinging on the photosensors generated by reflection of optical radiation emitted by the first optical radiation source. At least one second set of signals is generated on basis of optical radiation impinging on the photosensors generated by reflection of optical radiation emitted by the at least one second optical radiation source. By employing the at least two optical radiation sources in the tracker unit that are eccentrically arranged with respect to the tracker pointing axis, a non-coaxial optic configuration may be employed in the tracker unit while at the same time allowing for a coaxial optic behavior in the tracker unit to be mimiced or 'simulated'.

20 Claims, 11 Drawing Sheets

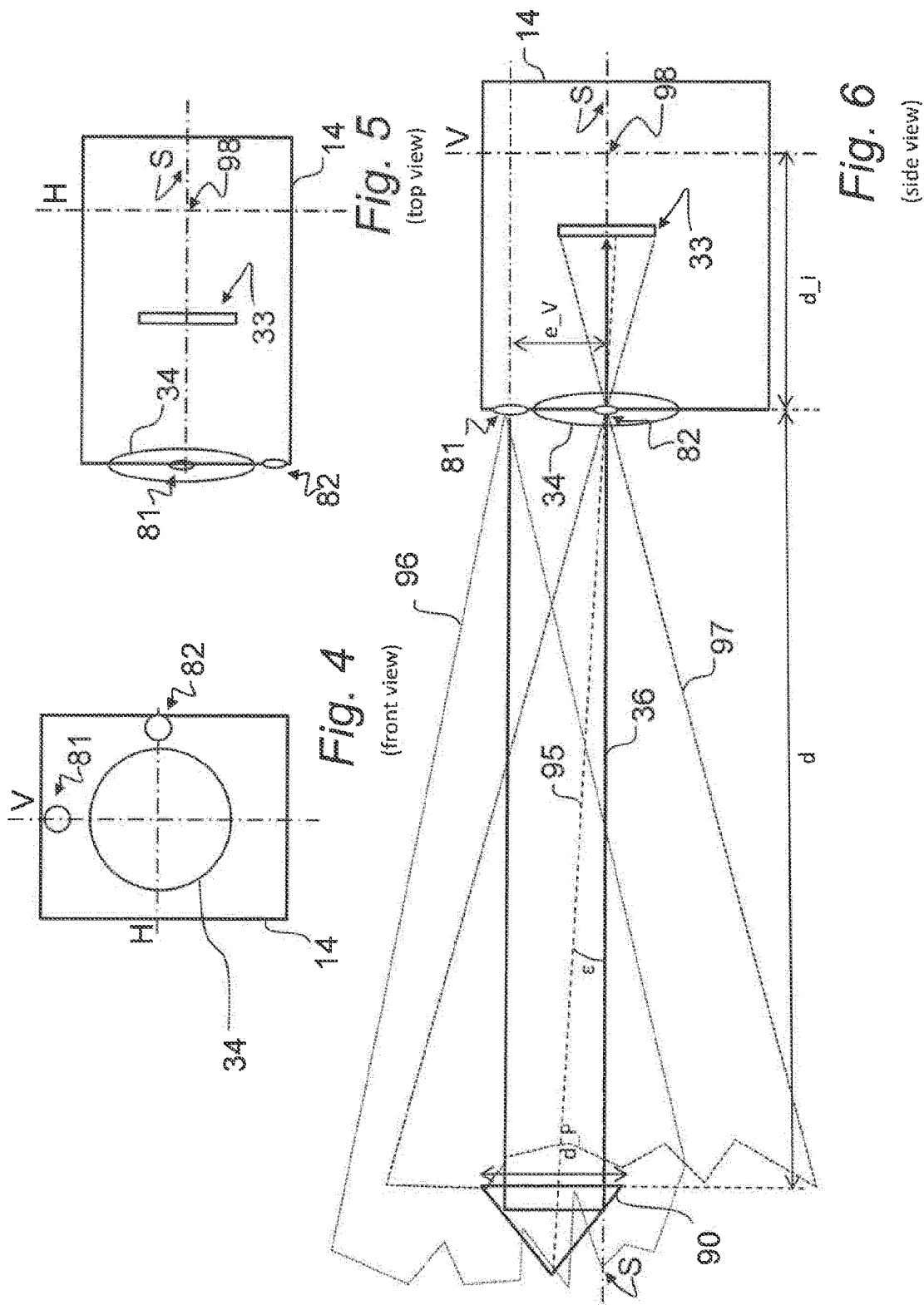

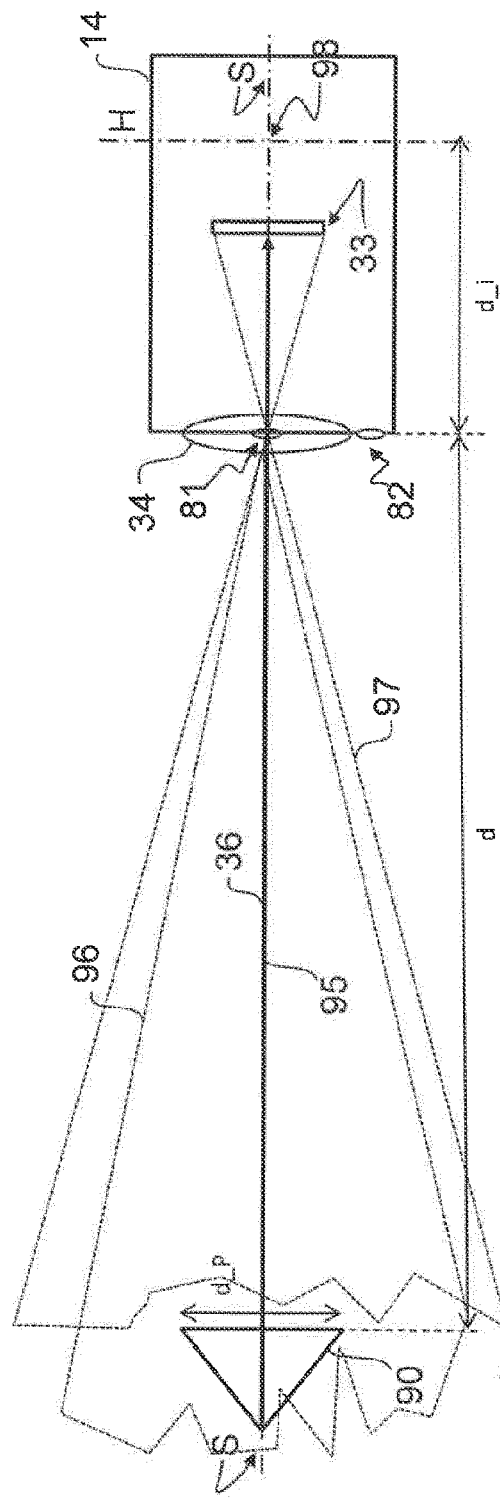
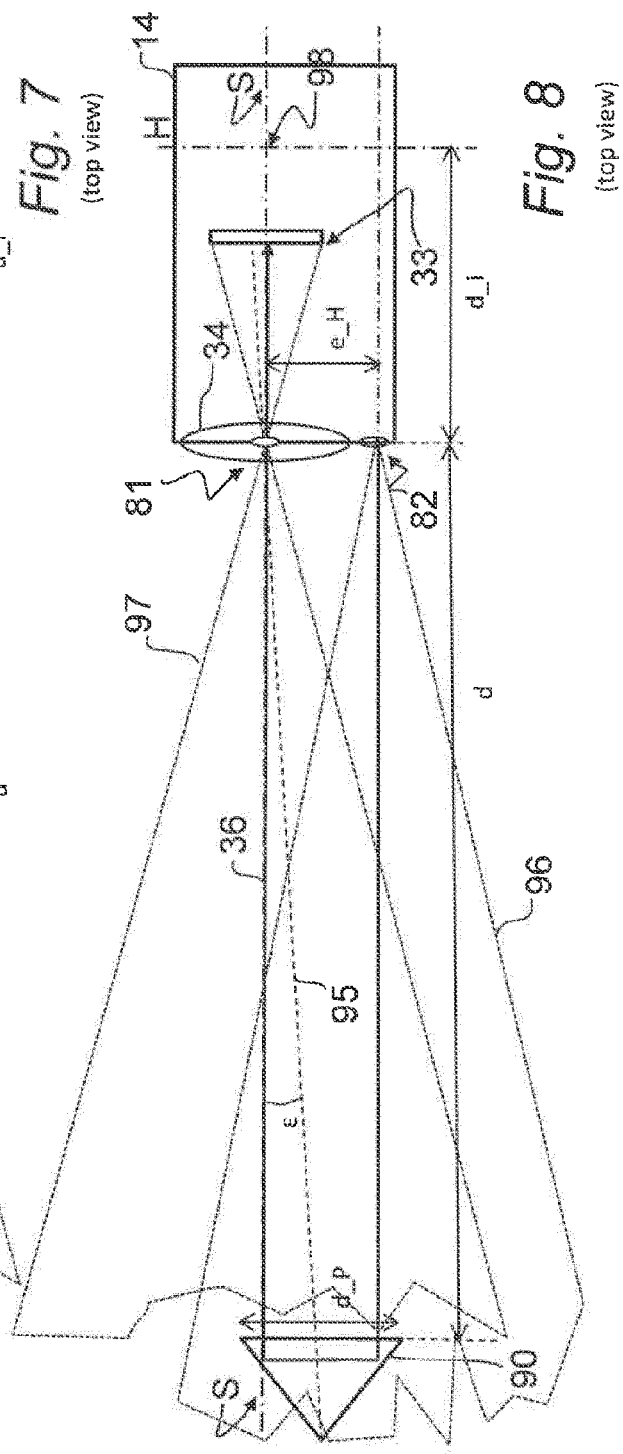
Fig. 7 (top view)
Fig. 8 (top view)

(side view)

TRACKER UNIT AND METHOD IN A TRACKER UNIT

CROSS-REFERENCE TO RELATED APPLICATIONS

This application is a continuation of International Application No. PCT/EP2012/071655, filed Nov. 1, 2012, the entire contents of which are incorporated herein by reference in their entirety for all purposes.

TECHNICAL FIELD

The present invention generally relates to the field of measuring, particularly to surveying. Specifically, the present invention relates to a tracker unit for a measuring instrument, which tracker unit is operable to align the instrument sighting axis of the measuring instrument with a direction to a desired target relatively to the measuring instrument, i.e. with the target axis.

BACKGROUND

Surveying involves the determination of unknown positions, surfaces or volumes of objects or setting out of known coordinates using angle and distance measurements taken from one or more positions. In order to perform these measurements, a surveying device being of the type referred to as a total station, comprising a combination of electronics and optics, is frequently used. A total station can be provided with a computer or processing or control unit with writable information for measurements to be performed and for storing data obtained during the measurements. A total station may calculate the position of a target in a fixed ground-based coordinate system.

A tracking system can be used in surveying in order to search for, track, and/or follow targets or objects having or being reflective targets or objects, which prisms are capable of reflecting light impinging thereon after having been emitted by a transmitter, and which reflected light is received by a receiver. The reflective targets or objects can for example comprise reflective prisms, foils, or the like. Such a tracking system may sense the angular direction to the target, whereby the movement of a target having speeds possibly up to a few meters per second or more may be tracked or followed. The tracking system may thereby be used to aim a measuring instrument towards a desired target or object, or in other words, to align the instrument sighting axis of the measuring instrument with the current direction to the target relatively to the measuring instrument.

In the transmitter of a device such as a tracker or laser pointer, a coaxial optic configuration 150 is usually employed, illustrated in the schematic view in FIG. 16, typically including components such as an objective 157, a prism 155, one or more mirrors 152, one or more lenses 154, collimators 153, apertures (not shown in FIG. 16), and means for adjusting such components (not shown in FIG. 16). The reference numeral 151 indicates the laser. However, such a coaxial optic configuration 150 may be expensive due to a relatively high cost of such components, which can entail a relatively high overall cost of the device. The coaxial optic configuration 150 can entail optical effects such as shadows of the prism 155 and reflections on the prism 155 back to the receiver, i.e. crosstalk, which may degrade the performance of the operation of the device. The coaxial optic configuration 150 may require a collimation element or elements 153, as illustrated in FIG. 16, for collimation of the laser beam 156. In a coaxial optic configuration such as illustrated in FIG. 16, a coherent optical radiation source such as a laser may be required in order to achieve a beam of optical radiation or light that is focused through the coaxial optic such that only a limited amount of light or no light is 'spilled' that may be received by the receiver or sensor. The use of laser 151 can entail a limitation of laser spot size and non-homogeneity of the laser beam 156. The laser may be required to cover the field of view of the receiver, which may be about 2°. Laser beams may be non-homogeneous due to spatial coherence and diffraction effects at apertures of the laser source.

SUMMARY

In view of the above discussion, a concern of the present invention is to provide a tracker unit that overcomes or mitigates one or more of the possible disadvantages pertaining to employing a coaxial optic configuration as discussed in the foregoing.

To address at least one of this concern and other concerns, a tracker unit, a method, a measuring instrument, a computer program and a computer readable storage medium in accordance with the independent claims are provided. Preferred embodiments are defined by the dependent claims.

In a measuring instrument such as a so called total station, the directing or aiming of an instrument sighting axis of the measuring instrument onto a target can be performed by means of drive means in the measuring instrument capable of rotating an instrument body in the measuring instrument so as to adjust the direction of the instrument sighting axis.

In the context of the present application by a 'target', or 'reflective target', it is generally meant a reflective object, such as a reflective prism, a retroreflector e.g. being of the corner-cube type, and/or a foil or the like, which for example can be used in cooperation with an optical radiation source or light emitting element e.g. to identify, search for, find, track and/or follow, etc., an object on which the target is arranged.

The operation of the drive means may be controlled by a so called tracker unit, which often includes a lens unit and a tracker detector that evaluates an incoming signal in the form of an optical signal reflected off the target or object and controls the drive means to change the direction of the instrument sighting axis so as to coincide or substantially coincide with the target axis. By a target axis it is meant an axis passing through the measuring instrument, e.g. through the measuring instrument center, and the target. The tracker unit further includes an optical transmitter that transmits optical radiation towards the target. By means of the lens unit combined with the tracker detector, the tracker unit functions as an angular sensor that can determine an angle between the target axis and the pointing axis of the tracker. The pointing axis of the tracker may be aligned or calibrated so as to coincide with the instrument sighting axis. In that way, if the tracker pointing axis is directed onto the target, the measuring instrument can perform measurements relating to the target. For example, in case the measuring instrument is an instrument such as a total station and the tracker pointing axis is directed onto the target, the measuring instrument may measure polar coordinates of the target and determine the distance from the measuring instrument to the target.

In general, the tracker unit is capable of searching for a target, finding the target, cause the instrument sighting axis to become aimed at or directed onto the target, locking onto the target, and/or following the target in case the target begins to move. The target can be detected within the field of view of the tracker unit receiver. The tracker unit can determine a control signal that depends on an angle between the instrument sighting axis and the target axis. The control signal may for example become larger the larger the angle between the instrument sighting axis and the target axis, and become zero or substantially zero in case the instrument sighting axis is coincident or substantially coincident with the target axis. When the received optical signal on the tracker unit receiver is on the center point of the tracker unit receiver, the target is often said to be 'locked' by the tracker unit.

In a tracker unit employing a coaxial tracker transmitter configuration, the axes of the transmitter and the receiver of the tracker unit are coaxial, i.e. the transmitter and receiver axes are coincident or share a common axis, and the common axis is coaxial with the instrument sighting axis. In the case of a non-coaxial tracker transmitter configuration, due to the eccentric arrangement of the optical radiation sources of the tracker unit with respect to the receiver of the tracker unit, the tracker unit may lock onto the target in the plane of eccentricity offset even though the instrument sighting axis is non-coincident with the target axis in that plane. In other words, the tracker unit may lock onto the target in the plane of eccentricity offset even though the measuring instrument is not correctly aimed at the target axis in that plane. According to the present invention, a coaxial tracker configuration in a tracker unit is replaced with a 'simulated' coaxial configuration. This may enable or facilitate overcoming or mitigating one or more of the possible disadvantages with employing a coaxial tracker configuration as described in the foregoing, while retaining functionality and/or capability of a coaxial tracker configuration. This will be further described in the following.

According to the present invention, the tracker transmitter includes a first optical radiation source and at least a second optical radiation source, each of which optical radiation sources is arranged to selectively emit optical radiation towards a reflective target situated at a distance from the measuring instrument. Each of the optical radiation sources is arranged noncoaxially with respect to a tracker pointing axis of the tracker unit, and possibly also with respect to an instrument sighting axis of the measuring instrument. Hence, the optical radiation sources of the tracker unit are eccentrically arranged with respect to the receiver of the tracker unit, specifically with respect to the tracker pointing axis of the tracker unit. The tracker transmitter axis may be parallel but offset relatively to the tracker receiver axis. The tracker receiver axis may be coaxial with the instrument sighting axis. However, due to the eccentric arrangement of the optical radiation sources of the tracker unit with respect to the receiver of the tracker unit, in the plane of the eccentricity offset there may be an angle θ between the target axis and the tracker pointing axis, which angle θ may depend on the distance d between the tracker receiver and the target and on a type and diameter or size of the reflective target, e.g. a diameter d_P of a prism aperture when the target comprises a reflective prism.

The angle θ between the target axis and the tracker pointing axis depends on the eccentricity offset e.

The error, i.e. the angle θ, can be compensated for using a compensation table or a compensation function if the parameters e, d and d_P are known. While the parameter e may in general be known from the construction or mechanical design of the tracker unit, in particular the positions of the optical radiation sources in the tracker unit with respect to the tracker pointing axis, and the distance d can be deduced from a measurement or calculation of the distance between the tracker receiver and the target, e.g. using an electronic distance measurement device, d_P may in general vary depending on the particular application or work scenario and may be set by the user when choosing the particular type of target, e.g. a reflective prism, to be used in cooperation with the tracker unit.

According to one example, the compensation function can in a first approximation be (cf. the description below with reference to FIGS. 6 and 8):

$$\theta_{corr}=\arctan(e/[2 \cdot d]).$$

As also described further in the following, the tracker unit receiver may include or be constituted by a photosensor comprising a plurality of photosensors and an optical system adapted to project reflected optical radiation from a target onto the plurality of photosensors. The optical system of the photosensor module may for example comprise a lens unit including at least one lens, e.g. an objective lens, that is adapted to collect optical radiation or light and focus it onto the plurality of photosensors. According to another, more refined example, in which the derivation of the compensation formula in addition to the parameters e, d, d_P takes into account a lens diameter d_L of a lens of the optical system, the compensation function can be:

$$\theta_{corr}=\arctan([d\_L+6 \cdot e-2 \cdot d\_P]/[8 \cdot d]).$$

The latter compensation function takes into account that the optical radiation received by the tracker receiver may fill only a part or portion of the lens in an eccentric way. The double circle section shape of the received optical radiation or light in the lens can be modelled further by means of geometric calculations.

In particular on work sites employing a number of different reflective targets which for example are identified, tracked and/or followed by the tracker unit, the diameter or size of the reflective target, e.g. the prism diameter, can vary between targets. However, during such circumstances, it may not be feasible and/or be difficult to compensate for any errors arising due to the eccentric arrangement of the optical radiation sources of the tracker unit with respect to the receiver of the tracker unit using a compensation function such as the latter one of the compensation functions described above, since d_P may in general vary depending on the particular application or work scenario.

Principles of the present invention will now be described with reference to an embodiment of the present invention, according to which the measuring instrument is rotatable about a vertically oriented rotation axis V and about a horizontally oriented rotation axis H. By rotating the measuring instrument about the axes V and H, the direction in which an instrument sighting axis S of the measuring instrument is pointing can be selected or controlled. The tracker pointing axis is coaxial with the instrument sighting axis S. A first optical radiation source is arranged such that it when activated can emit optical radiation along or substantially along a direction parallel to the instrument sight axis S and such that it is noncoaxial with respect to the tracker pointing axis of the tracker unit, e.g. by the first optical radiation source being displaced in a direction parallel to the axis V with respect to the instrument sighting axis S. A second optical radiation source is arranged such that it when activated can emit optical radiation along or substantially along a direction parallel to the instrument sight axis S and such that it is noncoaxial with respect to the tracker pointing axis of the tracker unit, e.g. by the second optical radiation source being displaced in a direction parallel to the axis H with respect to the instrument sighting axis S. By the first and second optical radiation sources being arranged such that they each when activated can emit optical radiation along or substantially along a direction parallel to the instrument sight axis S it is meant that each of the first and second optical radiation source is substantially pointing in a direction parallel to the instrument sighting axis S. The first and second optical radiation sources are arranged at such positions so that the tracker pointing axis and the position of the first optical radiation source define a first plane, e.g. the plane V-S, and the tracker pointing axis and the position of the at least a second optical radiation source define a second plane, e.g. the plane H-S. The first and second optical radiation sources are arranged such that the first optical radiation source is coaxial with respect to the tracker pointing axis in a plane perpendicular to the first plane, e.g. in the H-S plane, and the at least a second optical radiation source is coaxial with respect to the tracker pointing axis in a plane perpendicular to the second plane, e.g. in the V-S plane. Thereby, the first optical radiation source is non-eccentric with respect to the tracker pointing axis in the H-S plane, and accordingly there will be no angle between the target axis and the tracker pointing axis in the H-S plane when the tracker unit has 'locked' onto the target in that plane and when using the first optical radiation source as tracker transmitter. Hence, in the H-S plane the tracker unit exhibits a coaxial optic behavior when employing the first optical radiation source as tracker transmitter. Also, the second optical radiation source is non-eccentric with respect to the tracker pointing axis in the V-S plane, and accordingly there will be no angle between the target axis and the tracker pointing axis in the V-S plane when the tracker unit has 'locked' onto the target in that plane and when using the second optical radiation source as tracker transmitter. Hence, in the V-S plane the tracker unit exhibits a coaxial optic behavior when employing the second optical radiation source as tracker transmitter. Thus, any such possible angles between the target axis and the tracker pointing axis occur only in the planes of the eccentricity offset, i.e. in the above-mentioned first and second planes, while in the H-S plane and the V-S plane the first and second optical radiation sources, respectively, are coaxial with respect to the tracker pointing axis. As described in the foregoing, such possible angles may depend on a distance between the tracker receiver and the target and on the diameter of the reflective target. Hence, by employing at least two optical radiation sources in the tracker unit, which optical radiation sources are eccentrically arranged with respect to the tracker pointing axis and positioned relatively to the tracker pointing axis such as described above, a non-coaxial optic configuration may be employed in the tracker unit while at the same time a coaxial optic behavior in the tracker unit may be mimiced or 'simulated'.

Embodiments of the present invention may be camera-based. For a camera-based implementation, a first image of the target may be captured while the first optical radiation source is emitting optical radiation and the second optical radiation source is not emitting optical radiation, and a second image of the target may be captured while the second optical radiation source is emitting optical radiation and the first optical radiation source is not emitting optical radiation. The respective positions of the target in the first and second images can then be determined. According to an embodiment of the present invention, based on the respective positions, an angle between the instrument sighting axis and the target axis in the H-S plane and in the V-S plane, respectively, may be determined or calculated. The determined or calculated angles may in turn be utilized for aiming the measuring instrument towards the desired target, or aligning the instrument sighting axis of the measuring instrument with the current direction to the target relatively to the measuring instrument, i.e. with the target axis. For example, the first and second optical radiation sources may comprise LEDs which may produce homogeneous light spots in the images, the positions of which light spots may be calculated or determined using e.g. appropriate image processing tools or techniques.

In alternative to a camera-based implementation, the tracker unit may instead of an imaging device or sensor utilize a position sensitive photosensor module such as a quadrant detector, operating using principles analogous to the camera-based implementation as described herein. The tracker unit may utilize a combination of a camera-based implementation and a position sensitive photosensor module such as a quadrant detector.

According to a first aspect of the present invention, there is provided a tracker unit for a measuring instrument which includes at least one rotatably arranged instrument body. The tracker unit comprises a tracker sensor or photosensor module comprising an optical system and a plurality of photosensors. The plurality of photosensors may e.g. be arranged at or substantially at the focal point of the optical system. Each photosensor is adapted to generate a signal corresponding to intensity of optical radiation impinging on the photosensor, which optical radiation has been generated by reflection of optical radiation at a reflective target, possibly located in the field of view of the photosensor module. The optical system is adapted to project the reflected optical radiation from the target onto the plurality of photosensors. The photosensor module is arranged such that a tracker pointing axis of the photosensor module is coaxial with respect to an instrument sighting axis of the measuring instrument. The tracker unit comprises a first and at least a second optical radiation source arranged at different positions and each of which is noncoaxially arranged with respect to the tracker pointing axis and adapted to emit optical radiation towards the reflective target when activated. The first and the at least a second optical radiation source are arranged at such positions so that the tracker pointing axis and the position of the first optical radiation source define a first plane and the tracker pointing axis and the position of the at least a second optical radiation source define a second plane, such that the first optical radiation source is coaxial with respect to the tracker pointing axis in a plane perpendicular to the first plane and the at least a second optical radiation source is coaxial with respect to the tracker pointing axis in a plane perpendicular to the second plane. The tracker unit comprises a control module adapted to selectively cause rotation of the at least one instrument body. The control module is adapted to at least once selectively activate and deactivate the first and the at least a second optical radiation source, respectively. The control module is adapted to cause the plurality of photosensors to generate at least one first set of signals on basis of optical radiation impinging on the photosensors generated by reflection of optical radiation emitted by the first optical radiation source. The control module is adapted to cause the plurality of photosensors to generate at least one second set of signals on basis of optical radiation impinging on the photosensors generated by reflection of optical radiation emitted by the at least a second optical radiation source. The tracker unit comprises a signal processing module adapted to extract information regarding an angle between a target axis and the instrument sighting axis in the plane perpendicular to the first plane and in the plane perpendicular to the second plane, respectively, on basis of the at least one first set of signals and the at least one second set of signals, respectively. The control module is adapted to, on a condition that the instrument sighting axis and the target axis are not aligned, cause rotation of the at least one instrument body on basis of the information regarding the angle between the target axis and the instrument sighting axis in the plane perpendicular to the first plane and in the plane perpendicular to the second plane, respectively, such that the instrument sighting axis becomes aligned with, or becomes closer to being aligned with, the target axis.

As mentioned in the foregoing, the photosensor module is arranged such that the tracker pointing axis is coaxial with respect to the instrument sighting axis. However, the tracker pointing axis must not necessarily be completely coaxial with respect to the instrument sighting axis. The present invention encompasses cases where there is a relatively small offset between the tracker pointing axis and the instrument sighting axis and/or where the tracker pointing axis is at a relatively small angle with respect to the instrument sighting axis, i.e. such that there is a predefined or selected orientation of the tracker pointing axis relatively to the instrument sighting axis, or vice versa. Possibly, there may be an angle between the tracker pointing axis and the instrument sighting axis, or vice versa, up to 0.1 gon or even more. In case there is a relatively small offset between the tracker pointing axis and the instrument sighting axis and/or the tracker pointing axis is at an angle with respect to the instrument sighting axis, the information regarding an angle between a target axis and the instrument sighting axis may be extracted further on basis of the above-mentioned offset and/or angle, e.g. by means of a calibration procedure performed prior to operation of the tracker unit.

The optical system of the photosensor module may for example comprise a lens unit including at least one objective lens that is adapted to collect optical radiation or light and focus it onto the plurality of photosensors. Angular information about the target can be derived e.g. from the position on the plurality of photosensors where optical radiation reflected off the target impinges relatively to the tracker pointing axis.

In the context of the present application, by an instrument sighting axis, or measuring instrument sighting axis, or line of sight vector of the measuring instrument, it is generally meant an axis passing through a centerpoint of the measuring instrument. The line of sight vector or instrument sighting axis may for example be coincident or substantially coincident with a beam direction of an electronic distance meter or measuring device in the measuring instrument. The instrument sighting axis may for example be defined by a cross hair, or reticle, and an objective center, or entrance pupil.

In the context of the present application, by a tracker pointing axis it is meant an axis passing through a geometrical centerpoint of the tracker detector or photosensor module and a center position of an optical system such as a lens unit, which is adapted to project reflected optical radiation from the target onto photosensors of the tracker detector. The geometrical centerpoint of the tracker detector or photosensor module may be defined in different ways, for example by a by means of calibration defined pixel coordinate of an imaging sensor or camera device chip, by a pixel coordinate of an imaging sensor or camera device chip that has been defined by the user, or by a 'physical' center pixel of an imaging sensor or camera device chip, or by the geometrical intersection center of a quadrant diode, depending on the particular configuration of the tracker detector or photosensor module.

In the context of the present application, by a target axis it is meant an axis passing through the measuring instrument, e.g. through the measuring instrument center, and the target.

In the context of the present application, by the first optical radiation source being coaxial with respect to the tracker pointing axis in a plane perpendicular to the first plane it is meant that the first optical radiation source is non-eccentric or substantially non-eccentric with respect to the tracker pointing axis in the plane perpendicular to the first plane. By the at least a second optical radiation source being coaxial with respect to the tracker pointing axis in a plane perpendicular to the second plane it is meant that the second optical radiation source is non-eccentric or substantially non-eccentric with respect to the tracker pointing axis in the plane perpendicular to the second plane. Thereby, any angles between the target axis and the tracker pointing axis will occur only in the planes of the eccentricity offset, i.e. in the first plane and in the second plane, while in the above-mentioned planes perpendicular to the first and second planes, the first and second optical radiation sources, respectively, are coaxial with respect to the tracker pointing axis. Such angles, if any, may depend on the distance between the photosensor module and the target and/or the size, e.g. diameter, of the reflective target.

According to a second aspect of the present invention, there is provided a method in a tracker unit for a measuring instrument including a rotatably arranged instrument body.

The tracker unit comprises a tracker sensor or photosensor module comprising an optical system and a plurality of photosensors. The plurality of photosensors may for example be arranged at or substantially at the focal point of the optical system. Each photosensor is adapted to generate a signal corresponding to intensity of optical radiation impinging on the photosensor, which optical radiation has been generated by reflection of optical radiation at a reflective target, possibly located in the field of view of the photosensor module. The optical system is adapted to project the reflected optical radiation from the target onto the plurality of photosensors. The photosensor module is arranged such that a tracker pointing axis is coaxial with respect to an instrument sighting axis of the measuring instrument. The tracker unit comprises a first and at least a second optical radiation source arranged at different positions and each of which is noncoaxially arranged with respect to the tracker pointing axis and adapted to emit optical radiation towards the reflective target when activated. The first and the at least a second optical radiation source are arranged at such positions so that the tracker pointing axis and the position of the first optical radiation source define a first plane and the tracker pointing axis and the position of the at least a second optical radiation source define a second plane, such that the first optical radiation source is coaxial with respect to the tracker pointing axis in a plane perpendicular to the first plane and the at least a second optical radiation source is coaxial with respect to the tracker pointing axis in a plane perpendicular to the second plane.

The method comprises causing the plurality of photosensors to generate at least one first set of signals on basis of optical radiation impinging on the photosensors generated by reflection of optical radiation emitted by the first optical radiation source. The plurality of photosensors are caused to generate at least one second set of signals on basis of optical radiation impinging on the photosensors generated by reflection of optical radiation emitted by the at least a second optical radiation source. Information regarding an angle between a target axis and the instrument sighting axis in the plane perpendicular to the first plane and in the plane perpendicular to the second plane, respectively, is extracted on basis of the at least one first set of signals and the at least one second set of signals, respectively. On a condition that the instrument sighting axis and the target axis are not aligned, the at least one instrument body is rotated on basis of the information regarding the angle between the target axis and the instrument sighting axis in the plane perpendicular to the first plane and in the plane perpendicular to the second plane, respectively, such that the instrument sighting axis becomes aligned with, or becomes closer to being aligned with, the target axis.

The generation of the at least one first set of signals and the generation of the at least one second set of signals may for example be performed successively, possibly with a time period inbetween, or simultaneously or substantially simultaneously.

According to a third aspect of the present invention, there is provided a measuring instrument including a rotatably arranged instrument body and a tracker unit according to the present invention.

According to a fourth aspect of the present invention, there is provided a computer program adapted to, when executed in a processor unit, perform a method according to the present invention. The processor unit may for example be a processor unit or module or control module included in the tracker unit.

According to a fifth aspect of the present invention, there is provided a computer-readable storage medium on which there is stored a computer program adapted to, when executed in a processor unit, perform a method according to the present invention.

The first and the at least a second optical radiation source may be arranged at such positions so that the first plane is orthogonal to the second plane, and such that the first optical radiation source is coaxial with respect to the tracker pointing axis in the second plane and the at least a second optical radiation source is coaxial with respect to the tracker pointing axis in the first plane. For example with reference to the embodiment of the present invention described above where the measuring instrument is rotatable about a vertically oriented rotation axis V and about a horizontally oriented rotation axis H, the first plane may be the V-S plane and the second plane may be the H-S plane. The first and second optical radiation sources may be arranged such that they each when activated can emit optical radiation substantially along a direction parallel to the instrument sight axis S, i.e. such that each of the first and second optical radiation source is substantially pointing in a direction parallel to the instrument sighting axis S.

According to another embodiment of the present invention, the first and second optical radiation sources are positioned on a first axis perpendicular to the instrument sighting axis, wherein the first axis and the instrument sighting axis intersect at an intersection point, and the first and second optical radiation sources are positioned on the first axis equidistantly or substantially equidistantly about the intersection point. Hence, the first optical radiation source may be displaced along the first axis in one direction with respect to the instrument sighting axis S, and the second optical radiation source may be displaced along the first axis in the other direction with respect to the instrument sighting axis S. The first and second optical radiation sources may be arranged such that they each when activated can emit optical radiation substantially along a direction parallel to the instrument sight axis S, i.e. such that each of the first and second optical radiation source is substantially pointing in a direction parallel to the instrument sighting axis S.

On a condition that the magnitude of the angle between the target axis and the instrument sighting axis in the plane perpendicular to the first plane and in the plane perpendicular to the second plane, respectively, exceeds a threshold value, the at least one instrument body may be rotated on basis of the information regarding the angle between the target axis and the instrument sighting axis in the plane perpendicular to the first plane and in the plane perpendicular to the second plane, respectively, such that the angle between the target axis and the instrument sighting axis in the plane perpendicular to the first plane and in the plane perpendicular to the second plane, respectively, is decreased below the threshold value. The threshold value may for example be selected based on the particular application requirements, needs or desires.

The reflective target may for example comprise a reflective prism and/or foil or the like.

The reflective target may for example comprise a retroreflector such as a corner-cube reflector.

In the context of the present application, by retroreflector it is meant a reflector for which substantially all optical radiation impinging on the reflector is reflected in the same direction as it enters the reflector (with exception for small diffraction effects).

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the accompanying drawings, in which:

FIGS. 4-9 are schematic views of an instrument body of a measuring instrument in accordance with an embodiment of the present invention;

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art. The steps of any method described herein do not have to be performed in the exact order as described, unless specifically stated.

Figure 1:
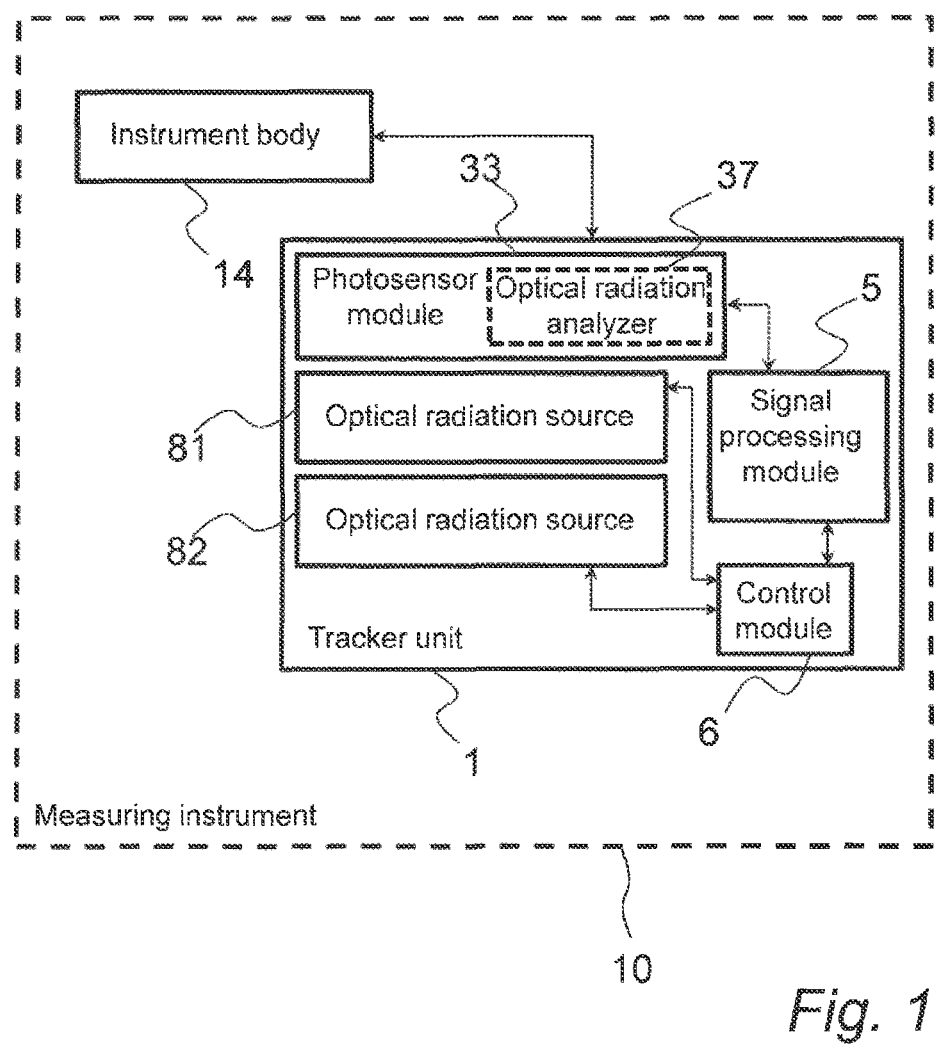
FIG. 1 is a schematic block diagram of a measuring instrument in accordance with an embodiment of the present invention.

Referring now to FIG. 1, there is shown a schematic block diagram of a measuring instrument 10 including a rotatably arranged instrument body 14 and a tracker unit 1 according to an embodiment of the present invention.

Measurements performed using the measurement instrument 10 may be with respect to or related to an origin of coordinates located within the instrument body 14. Hence, the instrument sighting axis of the measuring instrument 10, or the instrument sighting axis of the instrument body 14, may be centered at a point within the instrument body 14 such that rotation of the instrument body 14 changes the direction of the instrument sighting axis. In other words, by rotation of the instrument body 14, e.g. about a vertical rotation axis and a horizontal rotation axis, the instrument body 14 and/or measuring instrument 10 can be aimed in a desired direction.

The arrangement of the tracker unit 1 relatively to the measuring instrument 10 is according to an example. For example, the tracker unit 1 may be arranged separate from the measuring instrument 10 and operatively coupled to the measuring instrument 10, or vice versa.

The arrangement of the tracker unit 1 relatively to the instrument body 14 is according to an example. For example, the tracker unit 1 may be integrally arranged in the instrument body 14, i.e. the components or elements of the tracker unit 1 may be included in the instrument body 14.

The measuring instrument 10 may for example comprise or be constituted by a total station, a tachymeter, a theodolite, and/or a tracker. This list of examples is not exhaustive.

The tracker unit 1 comprises a photosensor module 33, a first optical radiation source 81, a second optical radiation source 82, a control module 5, and a signal processing module 6. The configuration and function of these components will be described in the following. It is to be understood that the tracker unit 1 may comprise further optical radiation sources in addition to the first and second optical radiation sources 81, 82. For example, the tracker unit 1 may comprise three, four, five, or six or more optical radiation sources (not shown in FIG. 1).

The photosensor module 33 comprises an optical radiation analyzer 37, which will be further described in the following. The optical radiation analyzer 37 is optional.

Figure 2:
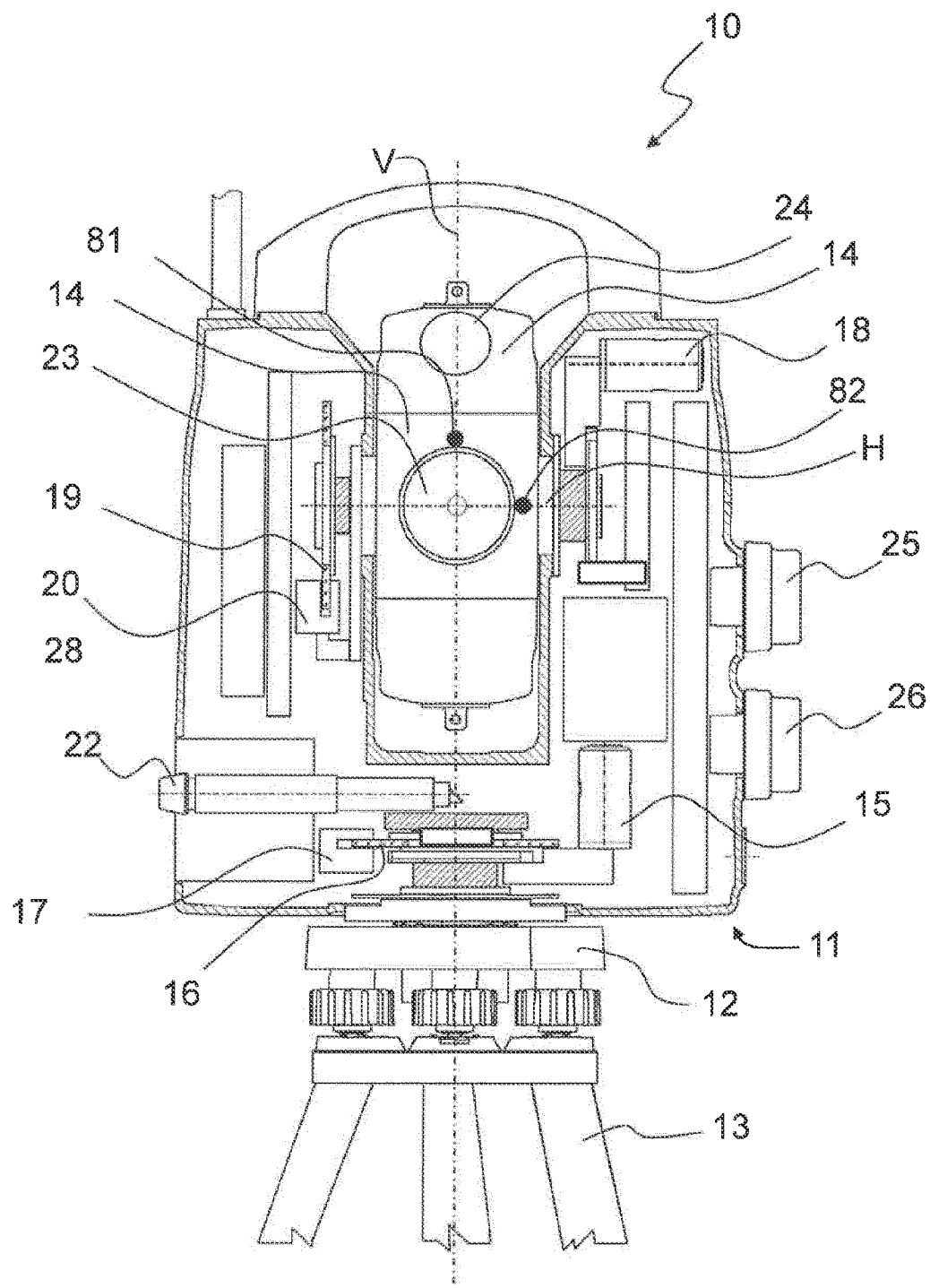
FIG. 2 is a schematic illustration of a measuring instrument, constituted by a total station, in accordance with an embodiment of the present invention.

Referring now to FIG. 2, there is shown a schematic illustration of a measuring instrument 10 in accordance with an embodiment of the present invention. In accordance with the embodiment depicted in FIG. 2, and also with the embodiment depicted in FIG. 3, the measuring instrument is constituted by a total station. However, the present invention is not limited to the measuring instrument being constituted by a total station, but the measuring instrument may comprise or constitute other instruments such as, but not limited to, a tachymeter, a theodolite, a tracker or another geodetic instrument.

With further reference to FIG. 2, the total station 10 comprises a first instrument body 11 constituted by an alidade 11 mounted on a base 12, and has a mounting support structure in the form of a tripod 13. The alidade 11 can be rotated about a vertically oriented rotation axis V in order to aim the total station 10 in any desired horizontal direction. In the alidade 11, there is arranged a second instrument body 14 constituted by a center unit 14 or telescope unit, which can be rotated about a horizontally oriented rotation axis H in order to aim the total station 10 in any desired vertical direction. Measurements performed using the total station 10 are typically with respect to or related to an origin of coordinates located at the intersection between the vertically oriented and the horizontally oriented rotation axes V and H. In other words, the instrument sighting axis of the total station 10, or line of sight vector of the total station 10, may be centered at the intersection between the vertical and the horizontal rotation axes V and H. This can be seen in FIG. 2 at the point where the axes V and H cross in the center of a telescope 23 in the center unit 14.

For rotation of the center unit 14 of the alidade 11 about the vertically oriented rotation axis V to aim the total station 10 in any desired horizontal direction, there is provided drive means 15. The rotational position of the alidade 11 is tracked by means of a graduated disc 16 and a corresponding angle encoder or sensor 17. For rotation of the center unit 14 about the horizontally oriented rotation axis H, there are provided drive means 18, graduated disc 19 and angle encoder or sensor 20 similar to or the same as drive means 15, graduated disc 16 and angle encoder or sensor 17. Moreover, the total station 10 has an optical plummet 22, which can provide a downwards view along the vertically oriented rotation axis V. The optical plummet 22 may be used by an operator or user to center or position the total station 10 above any desired point on the ground or floor above which the total station 10 is arranged.

According to the embodiment depicted in FIG. 2, a camera device 24 is arranged in the center unit 14 for capturing an image or a video feed generally in the direction of the instrument sighting axis of the total station 10. The camera device 24 may include an objective, a focusing lens and a photosensor module constituted by an imaging sensor 31 (not shown in FIG. 2, see FIG. 3). A target (not shown in FIG. 2) may be imaged or projected by the objective and focusing lens onto the imaging sensor 31. The imaging sensor 31 may for example comprise or be constituted by a charge-coupled device (CCD) based sensor, e.g. a CCD matrix sensor, which may comprise an arrangement of photo detecting or sensing elements which to a good approximation may be rectangular. Alternatively or optionally, the imaging sensor 31 may comprise an active-pixel sensor and/or a complementary metal-oxide-semiconductor (CMOS) based sensor. The camera device 24 is optional. In the instrument body 14 there is arranged a first optical radiation source 81 and a second optical radiation source 82, which are further described e.g. below with reference to FIGS. 4-9.

Figure 3:
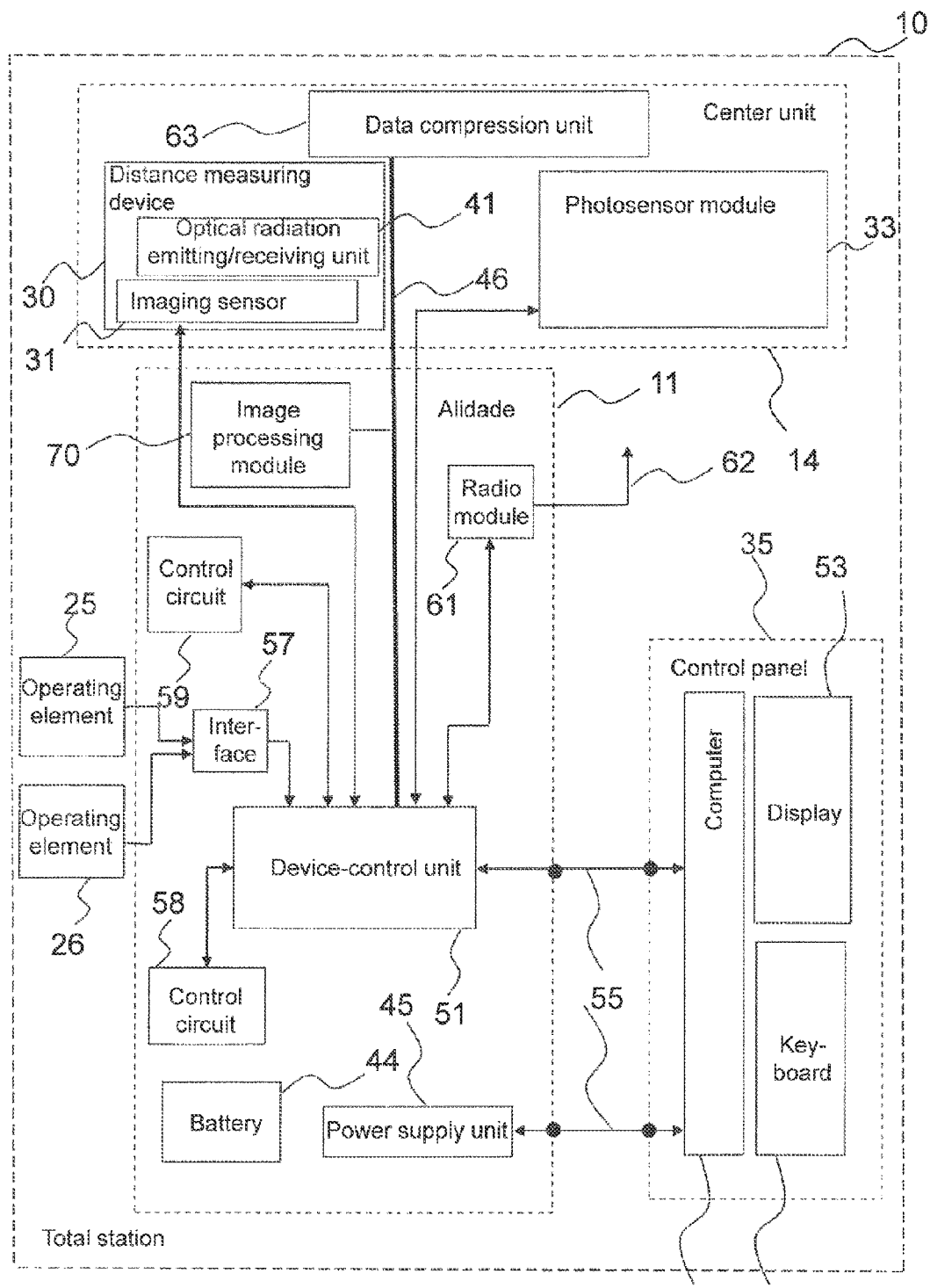
FIG. 3 is a schematic block diagram of a total station according to an embodiment of the present invention.

Referring now to FIG. 3 there is shown a schematic block diagram of the total station 10 illustrated in FIG. 2.

The total station 10 includes a distance measuring device 30 comprising an optical radiation emitting and/or receiving unit 41, which may include or be connected to the camera device 24. The optical radiation emitting and/or receiving unit 41 may include an objective and a beam splitter, e.g. a beam splitting prism (not shown in FIG. 3). The optical radiation emitting and/or receiving unit 41 may for example be adapted to emit pulses of infrared radiation or pulse of another wavelength or wavelengths and detect the time of flight of the pulses emitted by the optical radiation emitting and/or receiving unit 41 to a target (not shown in FIG. 3) and back to the optical radiation emitting/receiving unit 41 after having been reflected by the target, and on basis of the detected time of flight determine the distance between the target and the total station 10. With reference to FIG. 2, the optical radiation emitting and/or receiving unit 41 may include the first and the second optical radiation sources 81, 82 (not shown in FIG. 3).

The total station 10 may include a device-control unit 51, e.g. being arranged in the alidade 11, for controlling operation of the total station 10.

A battery 44 may be arranged in the alidade 11 for feeding a power supply unit 45 adapted to supply power to devices and components of the total station 10. The power supply unit 45 may supply all components and devices in the alidade 11 and/or in the center unit 14, as well as any modules or components connected to the alidade 11 and/or the center unit 14, with the required operating voltages. For the sake of better overview, corresponding connecting lines are not shown in FIG. 3. The individual components can be connected individually via separate lines as the case for components within the alidade 11 or by a central bus 46 which provides data and power supply lines between the alidade 11 and the center unit 14.

For control or operation of the total station 10, the total station 10 is provided with a control panel 35 and operating elements 25, 26 in the form of angle encoders arranged on the alidade 11 being operable by corresponding knobs. The device-control unit 51 is arranged in the alidade 11 for controlling operation of the total station 10 and is supplied with power by the power supply unit 45.

The control panel 35 may serve for communication between a user or operator and the total station 10, and may be provided with a keyboard 52 for input, a display 53 for output of data and/or images captured by the camera device 24, and a computer 54 or the like which is connected to the display 53 and the keyboard 52. The display 53 may e.g. include a Liquid Crystal Display (LCD).

The control panel 35 is connected to the device-control unit 51 arranged in the alidade 11 and the power supply unit 45 via a releasable connection 55 such that the control panel 35 is removably arranged. Since the control panel 35 is removable, it may be equipped with its own battery, which may ensure that the computer 54 may continue to be operable even when the control panel 35 is removed from the alidade 11. The computer 54 is connected to the device-control unit 51 via a connection 55 and may be capable of performing geodesic calculations by means of its computer program or computer programs and memory modules.

The operating elements 25, 26 are connected to the device-control unit 51 via corresponding interface 57. This interface 57 allows generation of signals corresponding to a rotary position of the operating elements 25, 26, respectively, which are transmitted to the device-control unit 51.

The operating elements 25 and 26 serve for controlling rotation of the alidade 11 about the vertical axis V and tilting of the center unit 14 about the tilting axis H, respectively. In response to signals from the operating elements 25 and 26, respectively, and the interface 57, the device-control unit 51 controls via control circuits 58 and 59 in the alidade 11 the drive means 15 and 18 to rotate the alidade 11 about the vertical axis V and the tilting axis V, respectively. Angle measurements may be used to control the drive means 15 and 18.

The drive means 15 and 18 are not necessarily controlled solely by the operating elements 25 and 26, respectively, but may in alternative or in addition be controlled on the basis of a program comprising machine instructions stored and executed in the device-control unit 51 and/or on the basis of commands sent to the device-control unit 51.

The drive means 15 and 18 cooperate with the angle-measuring device, i.e. the graduated disc 16 for the horizontal angle and the corresponding angle encoder or sensor 17, or the graduated disc 19 for the vertical angle and the corresponding angle encoder or sensor 20, respectively, such that the alidade 11 with the center unit 14 can be rotated as desired about the vertical axis V and the center unit 14 can be rotated about the horizontal axis H in a measurable manner and can be brought to a desired horizontal and vertical angle position. This purpose is served inter alia by the device-control unit 51 which may receive signals from the angle encoders or sensors 17 and 20 and control the control circuit 58 for the horizontal drive means 15 and the control circuit 59 for the vertical drive means 18 in response to and on basis of the received signals.

The total station 10 may include a radio module 61, which is connected to the device-control unit 51 and has an antenna 62. The radio module 61 may serve to exchange data with remote device, such as a remote control (not shown in FIG. 3). For example, the total station 10 may be remotely controlled by means of a remote control or a remote station (not shown in FIG. 3).

For processing the signals from the imaging sensor 31 of the camera device 24, a data compression unit 63 is provided in the center unit 14 which is adapted to compress image data received from the imaging sensor. The compressed data can then be sent to the device-control unit 51 which may process and/or forward the data to the computer 54 and the display 53.

The device-control unit 51 comprises a volatile memory, a non-volatile memory and a processor for executing programs stored in the non-volatile memory. An image processing module 70 is adapted to process the images obtained from the imaging sensor 31 and display the processed image on the display 53 using the computer 54 of the control panel, which image processing module 70 may be integrated in the device-control unit 51 or may be a separate module connected to the device-control unit 51. Furthermore, the image processing module 70 may be a computer program module implemented in the device-control unit 51 adapted to execute, for example, image processing operations or procedures. The image processing module 70 may in alternative be arranged in the center unit 14, or in any other suitable location depending on application and/or requirements.

The data compression unit 63 and/or image processing module 70 are optional.

The center unit 14 comprises a photosensor module 33, which is further described e.g. with reference to FIGS. 4-9 in the following. The photosensor module 33 may for example include or be constituted by an imaging device or sensor, as further described in the following. The imaging device or sensor may be similar or identical to the imaging device 31 described in the foregoing with reference to FIGS. 2 and 3.

Figure 9:
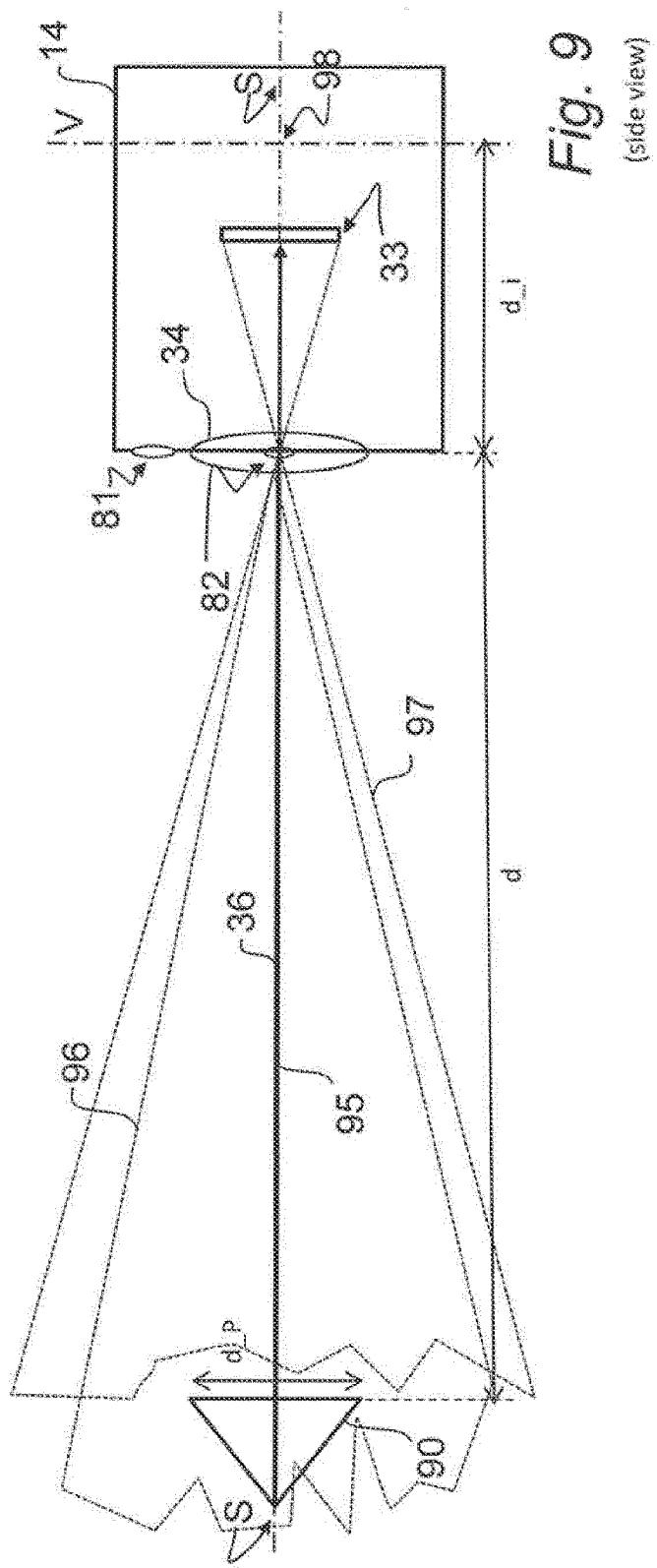

Referring now to FIGS. 4-9, there are shown schematic views of an instrument body 14 in accordance with an exemplifying embodiment of the present invention. FIG. 4 is a front view of the instrument body 14, FIGS. 5, 7 and 8 are sectional top views of the instrument body 14, and FIGS. 6 and 9 are sectional side views of the instrument body 14.

The instrument body 14 is rotatably arranged in a measuring instrument (not shown in FIGS. 4-9), e.g. a total station 10 as depicted in FIGS. 2 and 3, so that the instrument body 14 is rotatable about a vertically oriented rotation axis V and about a horizontally oriented rotation axis H. By rotating the instrument body about the axes V and H, the direction in which an instrument sighting axis S is pointing can be selected or controlled.

In the instrument body 14 there is arranged a photosensor module 33 comprising a plurality of photosensors (not shown in FIGS. 4-9). The photosensor module 33 is comprised in a tracker unit for the measuring instrument. Each photosensor is adapted to generate a signal corresponding to intensity of optical radiation impinging on the photosensor, which optical radiation has been generated by reflection of optical radiation at a reflective target 90 located in the field of view 97 of the photosensor module 33. According to the embodiment illustrated in FIGS. 4-9, the target 90 comprises a reflective prism 90. The reflective prism 90 may for example be of a corner-cube type. An optical system 34 is adapted to project optical radiation, which has been reflected off the target 90, onto the plurality of photosensors.

The photosensor module 33 is arranged such that a tracker pointing axis 36 of the photosensor module 33 or tracker unit is coaxial or substantially coaxial with respect to the instrument sighting axis S.

In the instrument body 14 there is arranged a first optical radiation source 81 and a second optical radiation source 82. As illustrated in FIGS. 4-9, the optical radiation sources 81, 82, or light-emitting elements, are arranged at different positions in the instrument body 14 such that each of the optical radiation sources 81, 82 is noncoaxially arranged with respect to the tracker pointing axis 36. Each of the optical radiation sources 81, 82 is adapted to emit optical radiation towards the reflective target 90 when activated. As illustrated in particular in FIG. 4, the first optical radiation source 81 is arranged at a distance from the optical system 34 along an axis parallel to the axis V and the second optical radiation source 82 is arranged at a distance along an axis parallel to the axis H.

As can be seen from FIGS. 4 and 5, the first optical radiation source 81 is positioned on a first axis perpendicular to the instrument sighting axis S, and the second optical radiation source is positioned on a second axis perpendicular to the instrument sighting axis S, wherein the first and second axes and the instrument sighting axis S are mutually perpendicular. According to the embodiments depicted in FIGS. 4 and 5, the first axis is parallel to V and the second axis is parallel to H.

FIGS. 6-9 illustrate situations when the received optical signal or optical radiation on the photosensor module 33, or tracker unit receiver, is incident on or substantially on a center point of the photosensor module 33, as indicated by the solid arrows in FIGS. 6-9, such that the target 90 is 'locked' by the tracker unit, and when using the first optical radiation source 81 or the second optical radiation source 82 as tracker unit transmitter.

The elements 96 and 97 in FIGS. 6 and 7 indicate the fields of view of the optical radiation source 81 and the photosensor module 33, respectively. The elements 96 and 97 in FIGS. 8 and 9 indicate the fields of view of the optical radiation source 82 and the photosensor module 33, respectively.

The position of the first optical radiation source 81 and the tracker pointing axis 36 define a plane V-S, and the position of the second optical radiation source 82 and the tracker pointing axis 36 define a plane H-S. According to the embodiment depicted in the planes V-S and H-S are perpendicular. However, this is not required. The first optical radiation source 81 is coaxial with respect to the tracker pointing axis 36 in a plane perpendicular to the plane V-S, which is the plane H-S according to the depicted embodiment, The second optical radiation source 82 is coaxial with respect to the tracker pointing axis 36 in a plane perpendicular to the plane H-S, which is the plane V-S according to the depicted embodiment.

Thereby, the first optical radiation source 81 is arranged such that it is non-eccentric with respect to the tracker pointing axis 36 in the H-S plane, and accordingly there will be no angle between the target axis 95 and the tracker pointing axis 36 in the H-S plane when employing the first optical radiation source 81 as tracker unit transmitter. This is illustrated in FIG. 7. The target axis 95 is an axis passing through a point in the instrument body 14, e.g. an instrument center point 98 on the instrument sighting axis S as illustrated in FIGS. 6-9, and the target 90. According to the embodiments depicted in FIGS. 5-9, the instrument center point 98 is defined as a point of intersection between the H, V and S axes. In case there would be no intersection between the axes H, V and S in the instrument body 14 (this example is not shown in FIGS. 5-9), the instrument center point could for example be defined as a center point of a small or minimum volume enclosed tangentially by the axes H, V and S. Note that the instrument center point 98 is only schematically indicated in FIGS. 5-9.

The second optical radiation source 82 is arranged such that it is non-eccentric with respect to the tracker pointing axis 36 in the V-S plane, and accordingly there will be no angle between the target axis 95 and the tracker pointing axis 36 in the V-S plane when employing the second optical radiation source 82 as tracker unit transmitter. This is illustrated in FIG. 9.

Thus, any possible angles є between the target axis 95 and the tracker pointing axis 36 when the tracker unit has 'locked' onto the target 90 and when using the first optical radiation source 81 as tracker unit transmitter will occur only in the plane V-S where the first optical radiation source 81 is offset from a coaxial state with respect to the tracker pointing axis 36. This is illustrated in FIG. 6 and indicated by the distance e_V. A distance between the photosensor module 33, or optical system 34, and the target 90, is indicated by d in FIG. 6, and also in FIGS. 7-9. In a first approximation when d>>d_i, where d_i is a distance between the optical system 34 and the instrument center point 98, the angle є can be expressed as $$\epsilon = \arctan(e\_V/(2 \cdot d)).$$

Hence, the instrument body 14 and/or the measuring instrument may be pointing 'wrong' in the V-S plane by an angle є when the tracker unit has 'locked' onto the target 90 and when using the first optical radiation source 81 as tracker unit transmitter.

Furthermore, any possible angles between the target axis 95 and the tracker pointing axis 36 when the tracker unit has 'locked' onto the target 90 and when using the second optical radiation source 82 as tracker unit transmitter will occur only in the plane H-S where the second optical radiation source 82 is offset from a coaxial state with respect to the tracker pointing axis 36. This is illustrated in FIG. 8 and indicated by the distance e_H. In a first approximation when d>>d_i, the angle ε can be expressed as $\epsilon = \arctan(e\_H/(2 \cdot d))$.

Hence, the instrument body 14 and/or the measuring instrument may be pointing 'wrong' in the H-S plane by an angle ε when the tracker unit has 'locked' onto the target 90 and when using the second optical radiation source 82 as tracker unit transmitter.

As described above, any such possible angles c between the target axis 95 and the tracker pointing axis 36 in different planes when the tracker unit has 'locked' onto the target 90 may depend on the distance d between the photosensor module 33, or optical system 34, and the target 90, and possibly on a diameter of the target 90, e.g. the prism diameter d_P. By prism diameter it is meant a diameter of an aperture of the prism.

However, as illustrated in FIG. 7, in the H-S plane the first optical radiation source 81 is coaxial with respect to the tracker pointing axis 36, and as illustrated in FIG. 9, in the V-S plane the second optical radiation source 82 is coaxial with respect to the tracker pointing axis 36.

Hence, in the H-S plane the tracker unit exhibits a coaxial optic behavior when employing the first optical radiation source 81 as tracker unit transmitter, and in the V-S plane the tracker unit exhibits a coaxial optic behavior when employing the second optical radiation source 82 as tracker unit transmitter.

Thus, by employing at least two optical radiation sources 81, 82 in the tracker unit, which first and second optical radiation sources 81, 82 are eccentrically arranged with respect to the tracker pointing axis 36 and positioned relatively to the tracker pointing axis 36 such as described above, a non-coaxial optic configuration may be employed in the tracker unit while at the same time allowing a coaxial optic behavior in the tracker unit to be mimiced or 'simulated'.

The instrument body 14 may for example be implemented by the center unit 14 described with reference to FIG. 2, which can be rotated about the horizontally oriented rotation axis H in order to aim the instrument body 14 in any desired vertical direction. For example by the instrument body 14 being arranged in an alidade as described with reference to FIG. 2, the instrument body 14 can further be rotated about the vertically oriented rotation axis V in order to aim the instrument body 14 in any desired horizontal direction.

The photosensor module 33 may be constituted by an imaging device or sensor 33. By means of the optical system 34 an image can be formed on the imaging device or sensor 33. The imaging device or sensor 33 is generally capable of capturing at least one image in the field of view 97. The optical system 34 may for example include one or more lenses, e.g. a focusing lens, and/or an objective, etc. The photosensor module 33 and the optical system 34 may for example be incorporated in a camera device.

The target 90 is not limited to being a reflective prism but can alternatively or in addition for example comprise a retroreflector or another suitable type of reflector capable of providing focused reflection (i.e. capable of a small reflection angle).

As illustrated in FIG. 2, the first and second optical radiation sources 81, 82 may be arranged adjacent to the telescope 23. However, other arrangements of the first and second optical radiation sources 81, 82 are possible. For example, the first and/or the second optical radiation source 81, 82 may be arranged behind an objective of the telescope 23.

In general, it may be desirable to position the first and second optical radiation sources 81, 82 relatively close to the tracker pointing axis 36. In this manner it may be ensured that optical radiation emitted from the optical radiation sources 81, 82 and reflected on the reflective prism 90 is reflected back towards the instrument body 14 or measuring instrument such that the reflected optical radiation can be detected by the photosensor module 33, even though a relatively small reflective prism 90 is used and/or the distance between the instrument body 14 and/or measuring instrument and the reflective prism 90 is relatively large. With reference to FIG. 2, an arrangement of the first and/or the second optical radiation sources 81, 82 for example behind the objective of the telescope 23 may facilitate reduction of the size of the overall tracker unit and/or measuring instrument, and/or simplify fixation of the optical radiation source or sources 81, 82 in the tracker unit.

With reference to FIG. 3, the first and the second optical radiation sources 81, 82 may for example be arranged in the optical radiation emitting and/or receiving unit 41.

The first and/or the second optical radiation source 81, 82 may for example comprise at least one light-emitting diode (LED). The LED may for example be an inorganic LED, an organic LED (OLED), a quantum dot (QD) LED, and/or another type of LED. In alternative or in addition, the first and/or the second optical radiation source 81, 82 may comprise at least one so called super luminescent diode (SLD), available e.g. from Hamamatsu Photonics Norden AB, Torshamnsgatan 35, SE-164 40, Kista, Sweden.

Alternatively or optionally, the first and/or the second optical radiation source 81, 82 may comprise a laser or the like, and/or another type of suitable optical radiation source or light-emitting element.

Alternatively or optionally, the first and/or the second optical radiation source 81, 82 may comprise an outcoupling end of at least one waveguide, e.g. an optical fiber, arranged so as to be able to couple out optical radiation having been coupled into the at least one waveguide at an incoupling end thereof.

Referring now again to FIG. 1, the tracker unit 1 comprises a control module 5 and a signal processing module 6, the operation of which will be described in the following. In case the measuring instrument 10 is or comprises a total station, the control module 5 may for example be constituted by the device-control module 51 or another control module arranged in the total station 10 described with reference to FIGS. 2 and 3.

The control module 5 is adapted to selectively cause rotation of the instrument body 14, and at least once selectively activate and deactivate the first optical radiation source 81 and the second optical radiation source 82, respectively.

The control module 5 is adapted to cause the plurality of photosensors in the photosensor module 33 to generate at least one first set of signals on basis of optical radiation impinging on the photosensors generated by reflection of optical radiation emitted by the first optical radiation source 81, and at least one second set of signals on basis of optical radiation impinging on the photosensors generated by reflection of optical radiation emitted by the second optical radiation source 82.

The generation of the at least one first set of signals and the generation of the at least one second set of signals may be performed at the same time or substantially at the same time. Possibly, the control module 5 may be adapted to cause the plurality of photosensors in the photosensor module 33 to generate at least one first set of signals during a period when the first optical radiation source 81 is activated, and at least one second set of signals during a period when the second optical radiation source 82 is activated. The above-mentioned periods may be consecutive or close to consecutive in time, or overlapping to some extent.

With reference to the example embodiment of the present invention described with reference to FIGS. 4-9, the signal processing module 6 is adapted to extract information regarding an angle between the target axis 95 and the instrument sighting axis S in the plane H-S perpendicular to the first plane V-S and in the plane V-S perpendicular to the second plane H-S, respectively, on basis of the at least one first set of signals and the at least one second set of signals, respectively. The control module 5 is adapted to, on a condition that the instrument sighting axis S and the target axis 95 are not aligned, cause rotation of the instrument body 14 on basis of the information regarding the angle between the target axis 95 and the instrument sighting axis S in the plane H-S, perpendicular to the first plane V-S, and in the plane V-S, perpendicular to the second plane H-S, respectively, such that the instrument sighting axis S becomes aligned with, or becomes closer to being aligned with, the target axis 95.

In general, the control module 5 is adapted to cause the plurality of photosensors to generate at least one first set of signals on basis of optical radiation impinging on the photosensors generated by reflection of optical radiation emitted by the first optical radiation source 81, and at least one second set of signals on basis of optical radiation impinging on the photosensors generated by reflection of optical radiation emitted by the second optical radiation source 82. The signal processing module 6 is adapted to extract information regarding an angle between the target axis 95 and the instrument sighting axis S in the plane perpendicular to the first plane and in the plane perpendicular to the second plane, respectively, on basis of the at least one first set of signals and the at least one second set of signals, respectively. The control module 5 is adapted to, on a condition that the instrument sighting axis S and the target axis 95 are not aligned, cause rotation of the instrument body 14 on basis of the information regarding the angle between the target axis 95 and the instrument sighting axis S in the plane perpendicular to the first plane and in the plane perpendicular to the second plane, respectively, such that the instrument sighting axis S becomes aligned with, or becomes closer to being aligned with, the target axis 95.

Thus, a procedure for operation of the tracker unit 1 is provided such that the influence of any possible angles between the target axis 95 and the tracker pointing axis 36, which angles might arise due to the optical radiation sources 81, 82 being noncoaxially arranged with respect to the tracker pointing axis 36, when locking the tracker unit 1 onto the target 90 can be 'cancelled out' from the determination of any angles between the target axis 95 and the instrument sighting axis S. Thereby, it can be mitigated or even avoided that the tracker unit locks onto the target 90 in a plane of eccentricity offset even though the measuring instrument 10 and/or instrument body 14 is not correctly aimed at the target axis 90 in that plane.

The photosensor module 33 may for example comprise a position sensitive photosensor device such as a quadrant detector.

With further reference to FIG. 1, the photosensor module 33 comprises an optical radiation analyzer 37 or optical radiation distinguishing means, which is optional. The optical radiation analyzer 37 is adapted to distinguish between optical radiation impinging on the photosensor module 33 generated by reflection of optical radiation emitted by different ones of the first and second optical radiation sources 81, 82 by sensing at least one distinguishing characteristic of the optical radiation impinging on the photosensor module 33. The arrangement of the optical radiation analyzer 37 in the photosensor module 33 is according to an example. Other arrangements of the optical radiation analyzer 37 in the tracker unit 1 are possible. For example, the optical radiation analyzer 37 may be arranged separate from the photosensor module 33, with the optical radiation analyzer 37 being coupled to the photosensor module 33.

The at least one distinguishing characteristic of the optical radiation may for example include wavelength, phase, modulation and/or pulse timing of the optical radiation.

By means of such a distinguishing functionality, sensing of optical radiation generated by reflection of optical radiation emitted by the first optical radiation source 81 at the reflective target 90 by the photosensor module 33 may be separated or distinguished from sensing of optical radiation generated by reflection of optical radiation emitted by the second optical radiation source 82 at the reflective target 90 by the photosensor module 33.

Hence, by means of the optical radiation analyzer 37 being capable of distinguishing between optical radiation impinging on the photosensor module 33 generated by reflection of optical radiation emitted by different ones of the first and second optical radiation sources 81, 82, generation of the at least one first set of signals and the generation of the at least one second set of signals at the same time or substantially at the same time and the subsequent processing thereof may be facilitated or even enabled.

Each of the first optical radiation source 81 and the second optical radiation source 82 may be configured to emit optical radiation in a respective predefined wavelength interval or at a respective predefined wavelength, and possibly such that the first optical radiation source 81 and the second optical radiation source 82 are capable of and possibly adapted to emit optical radiation in different wavelength intervals or at different wavelengths.

The distinguishing characteristic of the optical radiation can include wavelength. The optical radiation analyzer 37 may be adapted to detect wavelength of optical radiation impinging on the plurality of photosensors of the photosensor module 33 in order to distinguish between optical radiation impinging on the photosensor module 33 generated by reflection of optical radiation emitted by different ones of the first and second optical radiation sources 81, 82.

The first optical radiation source 81 and/or the second optical radiation source 82 may be configured such that the phases of the optical radiation emitted by the first optical radiation source 81 and the second optical radiation source 82, respectively, differ by a predefined phase shift, e.g. 180°.

The distinguishing characteristic of the optical radiation can include phase. The optical radiation analyzer 37 may be adapted to detect phase of optical radiation impinging on the plurality of photosensors of the photosensor module 33 in order to distinguish between optical radiation impinging on the photosensor module 33 generated by reflection of optical radiation emitted by different ones of the first and second optical radiation sources 81, 82.

The first optical radiation source 81 and/or the second optical radiation source 82 may be configured to emit continuous optical radiation or optical radiation modulated with respect to, for example, phase and/or frequency.

The distinguishing characteristic of the optical radiation may for example include modulation phase and/or frequency. The optical radiation analyzer 37 may be adapted to detect for example modulation phase and/or frequency of optical radiation impinging on the plurality of photosensors of the photosensor module 33 in order to distinguish between optical radiation impinging on the photosensor module 33 generated by reflection of optical radiation emitted by different ones of the first and second optical radiation sources 81, 82.

A so called 'lock in' technique may be used for distinguishing between optical radiation impinging on the photosensor module 33 generated by reflection of optical radiation emitted by different ones of the first and second optical radiation sources 81, 82 and ambient light.

The first optical radiation source 81 and/or the second optical radiation source 82 may be configured to emit pulsed optical radiation in accordance with respective selected pulse timings.

The distinguishing characteristic may include timing of pulses of optical radiation. The optical radiation analyzer 37 may be adapted to detect timing of pulses of optical radiation impinging on the plurality of photosensors of the photosensor module 33 in order to distinguish between optical radiation impinging on the photosensor module 33 generated by reflection of optical radiation emitted by different ones of the first and second optical radiation sources 81, 82. For example, the timing of pulses of the respective optical radiation sources 81, 82 may be synchronized with or correspond to exposure timing of the photosensor module 33.

The optical radiation analyzer 37 may be adapted to, for each photosensor of the plurality of photosensors on which optical radiation is impinging, provide or generate an indication of which of the first and second optical radiation sources 81, 82 the optical radiation is associated with. The indication may for example include a signal or a value that can be communicated or transmitted to the control module 5.

The control module 5 may be adapted to cause the plurality of photosensors of the photosensor module 33 to generate the at least one first set of signals and the at least one second set of signals further on basis of the indication or indications. Hence, by means of the indication or indications provided by the optical radiation analyzer 37, there may be distinguished between reflected optical radiation having originated from the first optical radiation source 81 or the second optical radiation source 82.

The control module 5 may be adapted to cause the plurality of photosensors in the photosensor module 33 to generate at least one first set of signals during a period when the first optical radiation source 81 is activated and the second optical radiation source 82 is deactivated, and at least one second set of signals during a period when the second optical radiation source 82 is activated and the first optical radiation source 81 is deactivated. The above-mentioned periods may be consecutive or close to consecutive in time. The plurality of photosensors of the photosensor 33 may be incorporated in an imaging device 33 or camera device. The imaging device 33 may be adapted to, on instruction from the control module 5, capture at least one image of the reflective target 90, wherein the at least one first set of signals and the at least one second set of signals constitute at least a first and at least a second image of the reflective target 90, respectively, captured by the imaging device 33.

The imaging device 33 may for example comprise an active-pixel sensor, a charge-coupled device (CCD) based sensor, and/or a complementary metal-oxide-semiconductor (CMOS) based sensor.

The imaging device 33 may optionally be adapted to produce a first and at least a second image representation of the first and the at least a second image, respectively. Processing of images may hence be done by means of processing respective corresponding image representations. Hence, when referring herein to processing of images, this may entail that an entity such as the imaging device 33 and/or signal processing module 6 processes images, by processing of the corresponding image representations. Alternatively or optionally, a separate image conversion entity may be provided for producing image representation of captured images.

The signal processing module 6 may be adapted to process the first and the at least a second image so as to extract information regarding an angle between the target axis 95 and the instrument sighting axis S in the plane perpendicular to the first plane and in the plane perpendicular to the second plane, respectively, on basis of the at least one first set of signals and the at least one second set of signals, respectively.

The signal processing module 6 may be adapted to process the first and the at least a second image so as to determine a position of the target 90 in the first image and a position of the target 90 in the at least a second image, respectively. The signal processing module 6 may be adapted to on basis of the determined positions extract the information regarding an angle between the target axis 95 and the instrument sighting axis S in the plane perpendicular to the first plane and in the plane perpendicular to the second plane, respectively.

The control module 5 may be adapted to cause the plurality of photosensors in the photosensor module 33 to generate at least one set of third signals during a period when both of the first optical radiation source 81 and the second optical radiation source 82 are deactivated, wherein the at least one third set of signals constitute at least one third image of the reflective target 90 captured by the imaging device 33.

For example, the imaging device 33 may be adapted to, on instruction from the control module 5, capture the at least one third image of the reflective target 90 immediately or substantially prior to or following capturing of the at least a first and/or the at least a second image of the reflective target 90, respectively, by the imaging device 33. Difference images between first and third images and between second and third images may be produced, e.g. by the signal processing module 6, so as to obtain first and second difference images, respectively. Thereby, the contribution from ambient illumination or ambient light in the resulting first and second difference images may be reduced or even eliminated. The signal processing module 6 may be adapted to process the resulting first and second difference images, instead of the first and the at least a second image as described above, so as to extract information regarding an angle between the target axis 95 and the instrument sighting axis S in the plane perpendicular to the first plane and in the plane perpendicular to the second plane, respectively.

Principles of capturing of at least one image of the reflective target 90 and processing thereof as described in the foregoing will now be described with reference to FIGS. 10-12.

Figure 10:
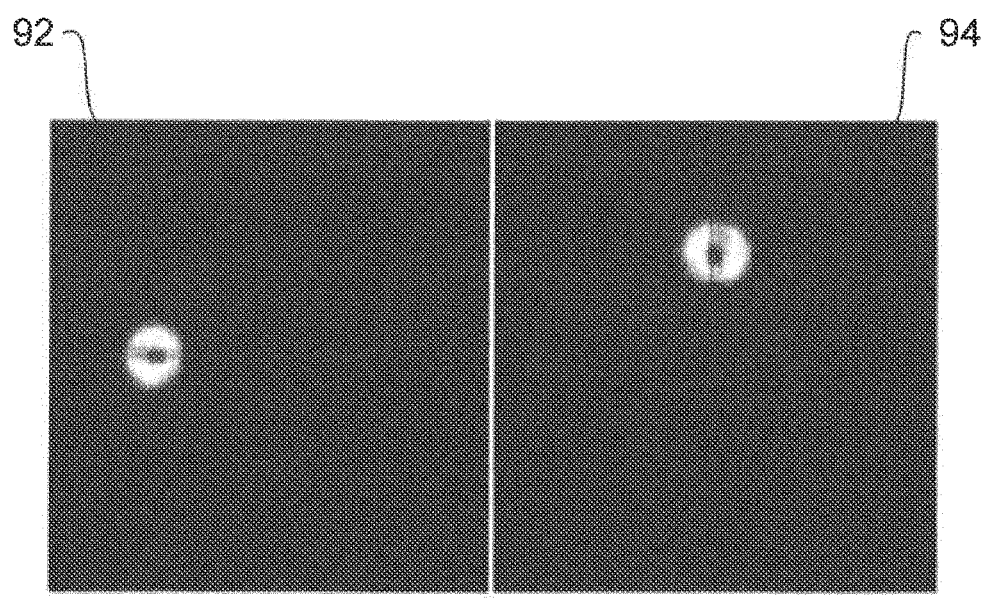
FIG. 10-12 show images captured by an imaging device included in a tracker unit in accordance with embodiments of the present invention.

FIG. 10 shows a first image 92 and a second image 94. The first and second images 92, 94 have been captured using an imaging device 33 such as described in the foregoing. The first image 92 has been captured at an instant when the first optical radiation source 81 is activated and emitting optical radiation towards a reflective target 90 comprising a reflective prism, and the second optical radiation source 82 is deactivated, i.e. not emitting any optical radiation towards the target 90. The second image 94 has been captured at an instant when the second optical radiation source 82 is activated and emitting optical radiation towards the target 90 and the first optical radiation source 81 is deactivated, i.e. not emitting any optical radiation towards the target 90.

In both of the first and second images 92, 94 the target 90 can be seen as a well-defined spot of light, the position of which in the images 92, 94 can be determined using image processing means or techniques. The positions of the spots of light in the images 92, 94 may for example be determined or calculated by means of center-of-gravity techniques, and/or by means of template matching or shape recognition or another suitable image processing method.

For both the first and second images 92, 94, the first and second optical radiation sources 81, 82 were LEDs.

As described in the foregoing, the signal processing module 6 may process the first image 92 and the second image 94 so as to determine the position of the target 90 in the first image and the position of the target 90 in the second image, respectively. On basis of the determined positions of the target 90 in the first and second images 92, 94, respectively, the signal processing module 6 may then extract the information regarding an angle between the target axis 95 and the instrument sighting axis S in the plane perpendicular to the first plane and in the plane perpendicular to the second plane, respectively.

Figure 11:
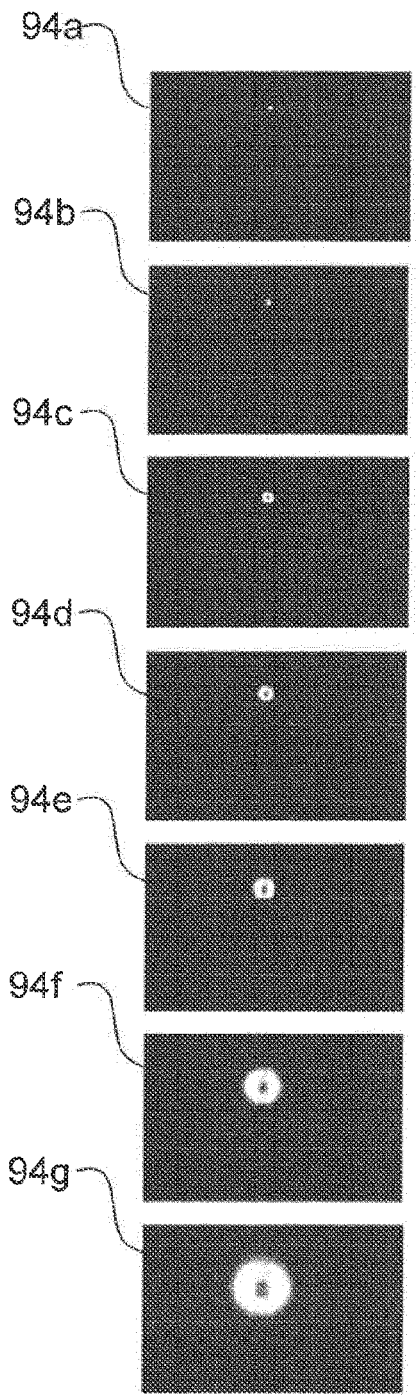

FIG. 11 shows images 94*a*-94*g* that correspond to image 94 shown in FIG. 10. For images 94*a*-94*g*, the target 90 was a reflective prism having an aperture having a diameter of about 60 mm and situated at a distance of 30 m, 20 m, 10 m, 7.5 m, 5 m, 2.5 m and 1.5 m, respectively, from the instrument body 14.

Figure 12:
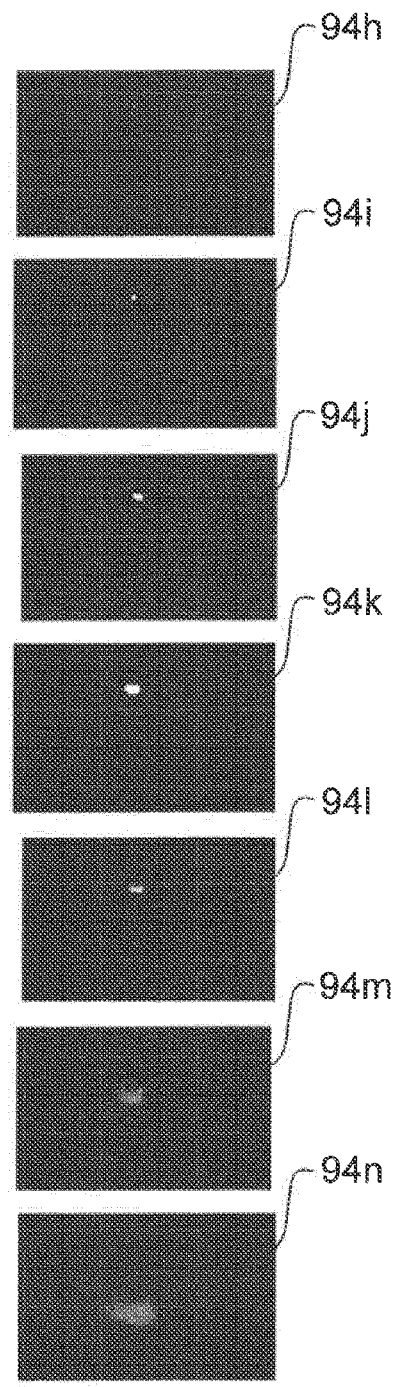

FIG. 12 shows images 94*h*-94*n* that correspond to image 94 shown in FIG. 10. For images 94*h*-94*n*, the target 90 was a reflective prism having an aperture having a size of about 20 mm and situated at a distance of 30 m, 20 m, 10 m, 7.5 m, 5 m, 2.5 m and 1.5 m, respectively, from the instrument body 14.

FIGS. 11 and 12 illustrate principles of embodiments of the present invention where the target 90 is a reflective prism having an aperture, for different diameters of the aperture. FIGS. 11 and 12 illustrate that the positions of the spot of light in the images in a plane where the optical radiation source is offset from a coaxial state with respect to the tracker pointing axis may be dependent on a distance d between the photosensor module, or optical system, and the target, and possibly on a diameter d_P of the target 90, e.g. the diameter of a prism aperture where the target is a reflective prism, cf. in particular FIGS. 6 and 8 and the above description referring to FIGS. 6-9. These dependencies may be difficult to handle and/or compensate for, since the distance d and/or the diameter d_P can vary according to application or user requirements or desires. However, in a plane perpendicular to the plane where the optical radiation source is offset from a coaxial state with respect to the tracker pointing axis, the positions of the spot of light in the images may be independent on the distance d and diameter d_P, cf. in particular FIGS. 7 and 9 and the above description referring to FIGS. 6-9. As described in the foregoing, in the plane perpendicular to the plane where the optical radiation source is offset from a coaxial state with respect to the tracker pointing axis, the tracker unit may exhibit a coaxial optic behavior when employing that optical radiation source as tracker unit transmitter.

Figure 13:
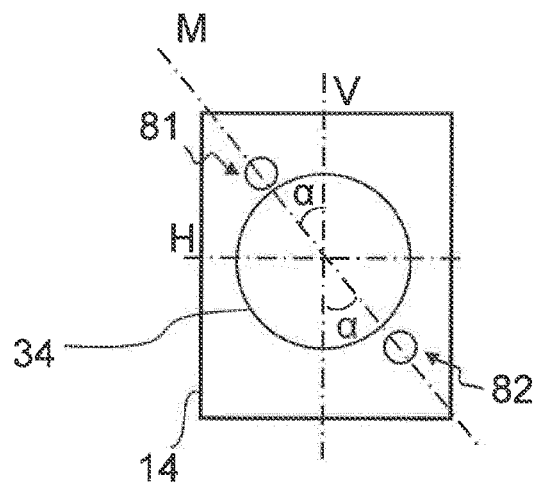
FIG. 13 is a schematic view of an instrument body of a measuring instrument in accordance with an embodiment of the present invention.

The arrangement of the first and second optical radiation source 81, 82 is not limited to that illustrated e.g. in FIGS. 2, 4 and 5 but variations are possible. For example, the first and second optical radiation sources 81, 82 may be positioned on a first axis perpendicular to the instrument sighting axis S, wherein the first axis and the instrument sighting axis S intersect at an intersection point and the first and second optical radiation sources 81, 82 are positioned on the first axis equidistantly or substantially equidistantly about the intersection point. This example is shown in FIG. 13, which shows a front view of an instrument body 14 in accordance with an embodiment of the present invention. The embodiment in FIG. 13 differs from the embodiment in FIG. 4 in the positioning of the first and second optical radiation sources 81, 82 with respect to the instrument sighting axis S. According to the embodiment depicted in FIG. 13, the first and second optical radiation sources 81, 82 are positioned close to or on an axis M that is perpendicular to the instrument sighting axis S. As indicated in FIG. 13, the axis M and the instrument sighting axis S intersect at an intersection point and the first and second optical radiation sources 81, 82 are positioned on the axis M equidistantly or substantially equidistantly about the intersection point. According to the embodiment depicted in FIG. 13, the axis M is arranged in a plane parallel to the V-H plane and arranged at an angle α to the axis V in the plane. The angle α may for example be about 45°, but other angles are also possible, e.g. 40° or less or 50° or more.

Still other arrangements of the first and second optical radiation sources 81, 82 than those illustrated in FIGS. 2, 4, 5 and 13 are possible. For example, the first and/or the second optical radiation source 81, 82 may be arranged behind the optical system 34, e.g. behind an objective of a telescope 23 such as depicted in FIG. 2.

In alternative or in addition to the photosensor module 33 comprising an imaging sensor 33, the photosensor module 33 may for example comprise a position sensitive photosensor device such as an array of photosensing elements and/or a so called quadrant sensor or detector such as a quadrant detector. The optical system 34, e.g. including an objective and/or a focusing lens, may be adapted to collect reflected optical radiation and convey the collected optical radiation to the plurality of photosensors in the photosensor module 33.

Figure 14:
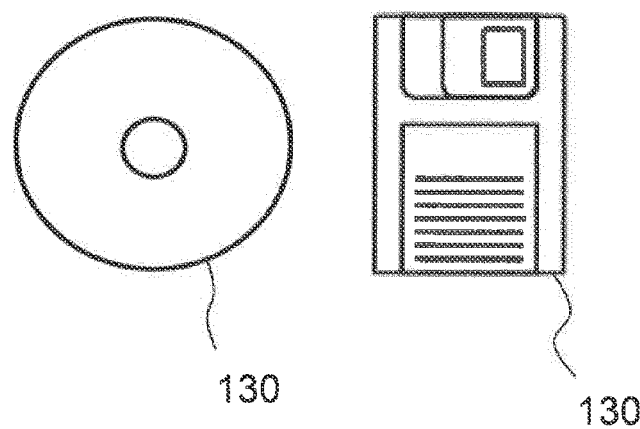
FIG. 14 is a schematic view of computer-readable storage medium according to embodiments of the present invention.

Referring now to FIG. 14, there are shown schematic views of computer readable storage mediums 130 according to embodiments of the present invention. According to these examples, the computer readable storage mediums 130 comprise a Digital Versatile Disc (DVD) 130 and a floppy disk 130. On the computer readable storage mediums 130 there may be stored a computer program comprising computer code adapted to perform, when executed in a processor unit, a method according to the present invention, e.g. a method 140 as described below with reference to FIG. 15.

Although only two different types of computer readable digital storage mediums have been described above with reference to FIG. 14, the present invention encompasses embodiments employing any other suitable type of computer-readable digital storage medium, such as, but not limited to, a non-volatile memory, a hard disk drive, a CD, a Flash memory, magnetic tape, a USB memory device, a Zip drive, etc.

Figure 15:
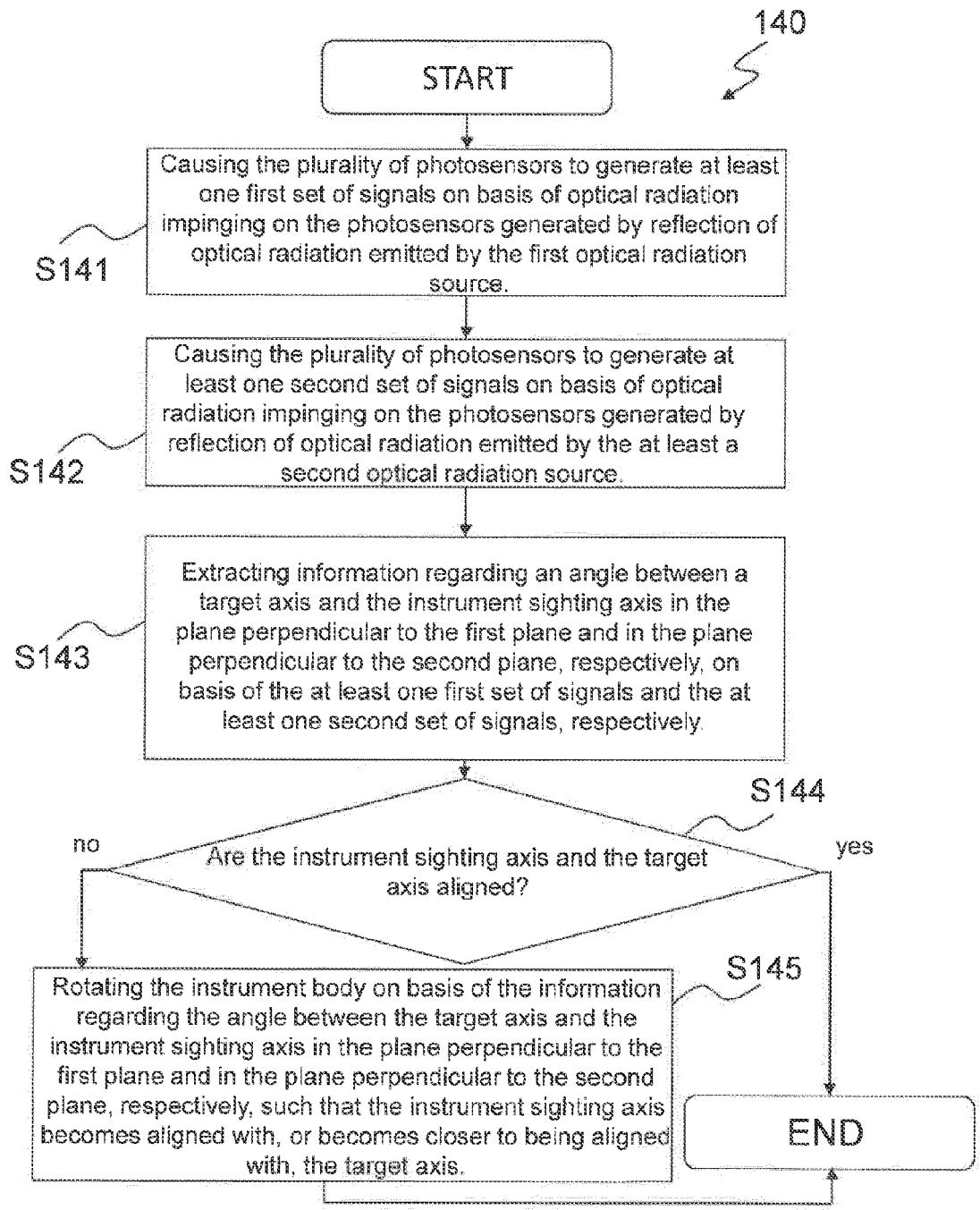
FIG. 15 is a schematic flowchart of a method according to an embodiment of the present invention.
Figure 16:
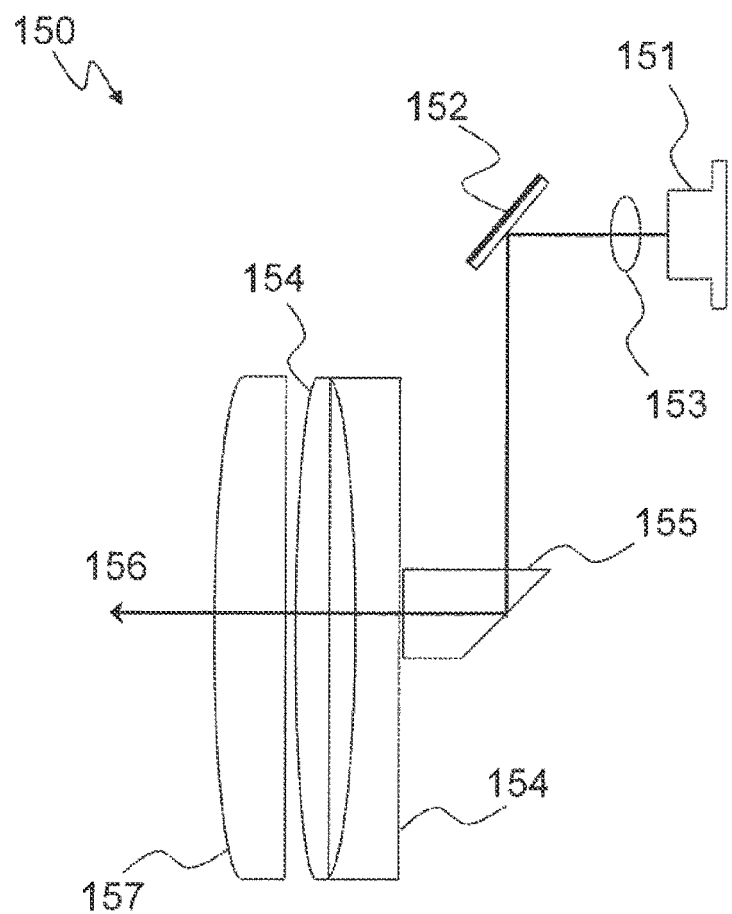
FIG. 16 is a schematic view of an example of a coaxial optic configuration in a tracker.

Referring now to FIG. 15, there is shown a schematic flowchart of a method 140 according to an embodiment of the present invention.

The method 140 is carried out in a tracker unit for a measuring instrument, which includes a rotatably arranged instrument body. The tracker unit comprises a photosensor module comprising a plurality of photosensors, where each photosensor is adapted to generate a signal corresponding to intensity of optical radiation impinging on the photosensor, which optical radiation has been generated by reflection of optical radiation at a reflective target. The reflective target may be located in the field of view of the photosensor module. The photosensor module comprises an optical system adapted to project the reflected optical radiation from the target onto the plurality of photosensors. The photosensor module is arranged such that a tracker pointing axis is coaxial with respect to an instrument sighting axis of the instrument body and/or the measuring instrument. The tracker unit comprises a first and at least a second optical radiation source arranged at different positions and each of which is noncoaxially arranged with respect to the instrument sighting axis and adapted to emit optical radiation towards the reflective target when activated. The first and the at least a second optical radiation source are arranged at such positions so that the tracker pointing axis and the position of the first optical radiation source define a first plane and the tracker pointing axis and the position of the at least a second optical radiation source define a second plane, and such that the first optical radiation source is coaxial with respect to the tracker pointing axis in a plane perpendicular to the first plane and the at least a second optical radiation source is coaxial with respect to the tracker pointing axis in a plane perpendicular to the second plane.

The method 140 comprises causing the plurality of photosensors to generate at least one first set of signals on basis of optical radiation impinging on the photosensors generated by reflection of optical radiation emitted by the first optical radiation source, S141.

The plurality of photosensors are caused to generate at least one second set of signals on basis of optical radiation impinging on the photosensors generated by reflection of optical radiation emitted by the at least a second optical radiation source, S142.

Information regarding an angle between a target axis and the instrument sighting axis in the plane perpendicular to the first plane and in the plane perpendicular to the second plane, respectively, is extracted on basis of the at least one first set of signals and the at least one second set of signals, respectively, S143.

A check is made whether the instrument sighting axis and the target axis are aligned, S144.

On a condition that the instrument sighting axis and the target axis are not aligned, the instrument body is rotated on basis of the information regarding the angle between the target axis and the instrument sighting axis in the plane perpendicular to the first plane and in the plane perpendicular to the second plane, respectively, such that the instrument sighting axis becomes aligned with, or becomes closer to being aligned with, the target axis, S145.

In conclusion, a tracker unit for a measuring instrument such as a total station is disclosed. The tracker unit comprises a first and at least a second optical radiation source arranged at different positions and each of which is noncoaxially arranged with respect to a tracker pointing axis and adapted to emit optical radiation towards the reflective target when activated. The first and the at least a second optical radiation source are arranged at such positions so that the tracker pointing axis and the position of the first optical radiation source define a first plane and the tracker pointing axis and the position of the at least a second optical radiation source define a second plane, such that the first optical radiation source is coaxial with respect to the tracker pointing axis in a plane perpendicular to the first plane and the at least a second optical radiation source is coaxial with respect to the tracker pointing axis in a plane perpendicular to the second plane. At least one first set of signals is generated on basis of optical radiation impinging on the photosensors generated by reflection of optical radiation emitted by the first optical radiation source. At least one second set of signals is generated on basis of optical radiation impinging on the photosensors generated by reflection of optical radiation emitted by the at least one second optical radiation source. By employing the at least two optical radiation sources in the tracker unit that are eccentrically arranged with respect to the tracker pointing axis, a non-coaxial optic configuration may be employed in the tracker unit while at the same time allowing for a coaxial optic behavior in the tracker unit to be mimiced or 'simulated'.

While the present invention has been illustrated and described in detail in the appended drawings and the foregoing description, such illustration and description are to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A tracker unit for a measuring instrument including at least one rotatably arranged instrument body, the tracker unit comprising:

a photosensor module comprising a plurality of photosensors, each photosensor being adapted to generate a signal corresponding to intensity of optical radiation impinging on the photosensor, which optical radiation has been generated by reflection of optical radiation at a reflective target, the photosensor module comprising an optical system adapted to project the reflected optical radiation from the target onto the plurality of photosensors, wherein the photosensor module is arranged such that a tracker pointing axis of the photosensor module is coaxial with respect to an instrument sighting axis of the measuring instrument;

a first and at least a second optical radiation source arranged at different positions and each of which is noncoaxially arranged with respect to the tracker pointing axis and adapted to emit optical radiation towards the reflective target when activated, wherein the first and the at least a second optical radiation source are arranged at such positions so that the tracker pointing axis and the position of the first optical radiation source define a first plane and the tracker pointing axis and the position of the at least a second optical radiation source define a second plane and such that the first optical radiation source is coaxial with respect to the tracker pointing axis in a plane perpendicular to the first plane and the at least a second optical radiation source is coaxial with respect to the tracker pointing axis in a plane perpendicular to the second plane;

a control module adapted to:
      selectively cause rotation of the at least one instrument body;
      at least once selectively activate and deactivate the first and the at least one second optical radiation source, respectively; and cause the plurality of photosensors to generate at least one first set of signals on basis of optical radiation impinging on the photosensors generated by reflection of optical radiation emitted by the first optical radiation source, and at least one second set of signals on basis of optical radiation impinging on the photosensors generated by reflection of optical radiation emitted by the at least one second optical radiation source; and a signal processing module adapted to extract information regarding an angle between a target axis and the instrument sighting axis in the plane perpendicular to the first plane and in the plane perpendicular to the second plane, respectively, on basis of the at least one first set of signals and the at least one second set of signals, respectively;

wherein the control module is adapted to, on a condition that the instrument sighting axis and the the target axis are not aligned, cause rotation of the at least one instrument body on basis of the information regarding the angle between the target axis and the instrument sighting axis in the plane perpendicular to the first plane and in the plane perpendicular to the second plane, respectively, such that the instrument sighting axis becomes aligned with, or becomes closer to being aligned with, the target axis.

2. A tracker unit according to claim 1, wherein the first and the at least a second optical radiation source are arranged at such positions so that the first plane is orthogonal to the second plane, and such that the first optical radiation source is coaxial with respect to the tracker pointing axis in the second plane and the at least a second optical radiation source is coaxial with respect to the tracker pointing axis in the first plane.

3. A tracker unit according to claim 1, wherein the control module is adapted to, on a condition that the magnitude of the angle between the target axis and the instrument sighting axis in the plane perpendicular to the first plane and in the plane perpendicular to the second plane, respectively, exceeds a threshold value, cause rotation of the at least one instrument body on basis of the information regarding the angle between the target axis and the instrument sighting axis in the plane perpendicular to the first plane and in the plane perpendicular to the second plane, respectively, such that the angle between the target axis and the instrument sighting axis in the plane perpendicular to the first plane and in the plane perpendicular to the second plane, respectively, is decreased below the threshold value.

4. A tracker unit according to claim 1, wherein the first optical radiation source is positioned on a first axis perpendicular to the instrument sighting axis and the at least a second optical radiation source is positioned on a second axis perpendicular to the instrument sighting axis, wherein the first and second axes and the instrument sighting axis are mutually perpendicular.

5. A tracker unit according to claim 1, wherein the first and second optical radiation sources are positioned on a first axis perpendicular to the instrument sighting axis, wherein the first axis and the instrument sighting axis intersect at an intersection point and the first and second optical radiation sources are positioned on the first axis equidistantly about the intersection point.

6. A tracker unit according to claim 1, wherein the control module is adapted to cause the plurality of photosensors to generate the at least one first set of signals during a period when the first optical radiation source is activated and the at least a second optical radiation source is deactivated and generate the at least one second set of signals during a period when the at least one second optical radiation source is activated and the first optical radiation source is deactivated.

7. A tracker unit according to claim 1, wherein the plurality of photosensors are incorporated in an imaging device adapted to, on instruction from the control module, capture at least one image of the reflective target, wherein the at least one first set of signals and the at least one second set of signals constitute at least a first and at least a second image of the reflective target, respectively, captured by the imaging device.

8. A tracker unit according to claim 1, further comprising an optical radiation analyzer adapted to distinguish between optical radiation impinging on the photosensor module generated by reflection of optical radiation emitted by different ones of the first and second optical radiation sources by sensing at least one distinguishing characteristic of the optical radiation impinging on the photosensor module.

9. A tracker unit according to claim 8, wherein the first optical radiation source and/or the at least a second optical radiation source are configured to emit optical radiation such that the distinguishing characteristic includes at least one of wavelength, phase, frequency, and timing of pulses of optical radiation.

10. A method in a tracker unit for a measuring instrument including a rotatably arranged instrument body, the tracker unit comprising a photosensor module comprising a plurality of photosensors, each photosensor being adapted to generate a signal corresponding to intensity of optical radiation impinging on the photosensor, which optical radiation has been generated by reflection of optical radiation at a reflective target, the photosensor module comprising an optical system adapted to project the reflected optical radiation from the target onto the plurality of photosensors, wherein the photosensor module is arranged such that a tracker pointing axis is coaxial with respect to an instrument sighting axis, the tracker unit comprising a first and at least a second optical radiation source arranged at different positions and each of which is noncoaxially arranged with respect to the tracker pointing axis and adapted to emit optical radiation towards the reflective target when activated, wherein the first and the at least a second optical radiation source are arranged at such positions so that the tracker pointing axis and the position of the first optical radiation source define a first plane and the tracker pointing axis and the position of the at least a second optical radiation source define a second plane, and such that the first optical radiation source is coaxial with respect to the tracker pointing axis in a plane perpendicular to the first plane and the at least a second optical radiation source is coaxial with respect to the tracker pointing axis in a plane perpendicular to the second plane, the method comprising:

causing the plurality of photosensors to generate at least one first set of signals on basis of optical radiation impinging on the photosensors generated by reflection of optical radiation emitted by the first optical radiation source;

causing the plurality of photosensors to generate at least one second set of signals on basis of optical radiation impinging on the photosensors generated by reflection of optical radiation emitted by the at least a second optical radiation source;

extracting information regarding an angle between a target axis and the instrument sighting axis in the plane perpendicular to the first plane and in the plane perpendicular to the second plane, respectively, on basis of the at least one first set of signals and the at least one second set of signals, respectively; and on a condition that the instrument sighting axis and the target axis are not aligned, rotating the at least one instrument body on basis of the information regarding angle between the target axis and the instrument sighting axis in the plane perpendicular to the first plane and in the plane perpendicular to the second plane, respectively, such that the instrument sighting axis becomes aligned with, or becomes closer to being aligned with, the target axis.

11. A computer program adapted to, when executed in a processor unit, perform a method according to claim 10.

12. A measuring instrument comprising:
at least one rotatably arranged instrument body,
a plurality of photosensors, and
a first and at least a second optical radiation source arranged at different positions, each of which being noncoaxially arranged with respect to an instrument sighting axis of the measuring instrument and adapted to emit optical radiation towards a reflective target,
wherein the first and the at least a second optical radiation source are arranged at such positions so that the instrument sighting axis and the position of the first optical radiation source define a first plane and the instrument sighting axis and the position of the at least a second optical radiation source define a second plane,
wherein the measuring instrument is adapted to determine, based on at least a first set of signals generated by the plurality of photosensors upon reception of optical radiation generated by reflection of optical radiation emitted by the first optical radiation source, a first angle between a target axis and the instrument sighting axis in a plane perpendicular to the first plane and, based on at least a second set of signals generated by the plurality of photosensors upon reception of optical radiation generated by reflection of optical radiation emitted by the second optical radiation source, a second angle between the target axis and the instrument sighting axis in a plane perpendicular to the second plane,
wherein the measuring instrument is adapted to cause rotation of the at least one instrument body based on the first angle and the second angle such that the instrument sighting axis becomes aligned with, or becomes closer to being aligned with, the target axis.

13. A measuring instrument according to claim 12, wherein the first and the at least a second optical radiation source are arranged at such positions so that the first plane is orthogonal to the second plane.

14. A measuring instrument to claim 12, wherein the measuring instrument is adapted to, on a condition that the magnitude of the first angle and the second angle, respectively, exceeds a threshold value, cause rotation of the at least one instrument body based on the first angle and the second angle, respectively, such that the first angle and the second angle, respectively, is decreased below the threshold value.

15. A measuring instrument according to claim 12, wherein the first optical radiation source is positioned on a first axis perpendicular to the instrument sighting axis and the at least a second optical radiation source is positioned on a second axis perpendicular to the instrument sighting axis, wherein the first and second axes and the instrument sighting axis are mutually perpendicular.

16. A measuring instrument according to claim 12, wherein the first and second optical radiation sources are positioned on a first axis perpendicular to the instrument sighting axis, wherein the first axis and the instrument sighting axis intersect at an intersection point and the first and second optical radiation sources are positioned on the first axis equidistantly about the intersection point.

17. A measuring instrument according to claim 12, wherein the measurement instrument is adapted to cause the plurality of photosensors to generate the at least one first set of signals during a period when the first optical radiation source is activated and the at least a second optical radiation source is deactivated and generate the at least one second set of signals during a period when the at least one second optical radiation source is activated and the first optical radiation source is deactivated.

18. A measuring instrument according to claim 12, wherein the plurality of photosensors are incorporated in an imaging device adapted to capture at least one image of the reflective target, wherein the at least one first set of signals, and the at least one second set of signals constitute at least a first and at least a second image of the reflective target, respectively, captured by the imaging device.

19. A measuring instrument according to claim 12, further comprising an optical radiation analyzer adapted to distinguish between optical radiation impinging on the plurality of photosensors generated by reflection of optical radiation emitted by different ones of the first and the at least a second optical radiation sources by sensing at least one distinguishing characteristic of the optical radiation impinging on the plurality of photosensors.

20. A measuring instrument according to claim 19, wherein the first optical radiation source and/or the at least a second optical radiation source are configured to emit optical radiation such that the distinguishing characteristic includes at least one of wavelength, phase, frequency, and timing of pulses of optical radiation.

* * * * *